United States Patent
Gondek et al.

(10) Patent No.: US 7,286,700 B2
(45) Date of Patent: Oct. 23, 2007

(54) RENDERING USING AT LEAST TWO LEVELS OF GRAY

(75) Inventors: Jay S. Gondek, Camas, WA (US); Stephen W. Bauer, San Diego, CA (US); Matthew A. Shepherd, Vancouver, WA (US); Guo Li, San Diego, CA (US); Luanne J. Rolly, Corvallis, OR (US)

(73) Assignee: Hewlett-Packard Development Company L.P., Houston, TX (US)

( * ) Notice: Subject to any disclaimer, the term of this patent is extended or adjusted under 35 U.S.C. 154(b) by 801 days.

(21) Appl. No.: 10/460,891

(22) Filed: Jun. 13, 2003

(65) Prior Publication Data

US 2004/0252885 A1 Dec. 16, 2004

(51) Int. Cl.
*G06K 9/00* (2006.01)
*G06K 9/32* (2006.01)
(52) U.S. Cl. ...................... 382/162; 382/300
(58) Field of Classification Search ......... 382/162, 382/164, 165, 167, 300; 358/1.3, 1.9, 2.1, 358/515, 523, 525; 345/589, 600–604
See application file for complete search history.

(56) References Cited

U.S. PATENT DOCUMENTS

| | | | | |
|---|---|---|---|---|
| 5,428,465 A | * | 6/1995 | Kanamori et al. | 358/518 |
| 6,262,810 B1 | * | 7/2001 | Bloomer | 358/1.9 |
| 6,571,010 B1 | * | 5/2003 | Inoue | 382/162 |
| 6,822,757 B1 | * | 11/2004 | Usami et al. | 358/1.9 |
| 6,903,747 B2 | * | 6/2005 | Kakutani | 345/600 |
| 7,016,530 B2 | * | 3/2006 | Saito et al. | 382/162 |
| 2004/0136014 A1 | * | 7/2004 | Maltz | 358/1.9 |

OTHER PUBLICATIONS

U.S. Appl. No. 10/349,880, filed Jan. 22, 2003, Huanzhao Zeng, et al.

* cited by examiner

*Primary Examiner*—Amir Alavi

(57) ABSTRACT

An indication of any target point internal to a first color space is received. The target point is rendered in a second color space using one of at least two levels of gray colorant and at most two primary colorants out of three primary colorants in the second color space.

46 Claims, 21 Drawing Sheets

RENDERING USING AT LEAST TWO LEVELS OF GRAY

RELATED APPLICATIONS

U.S. patent application Ser. No. 10/460,848, filed on Jun. 13, 2003, titled "Printer System and Printing Method," having inventors Jay S. Gondek, Matthew A. Shepard, Morgan T. Schramm, and John F. Meyer, now U.S. Pat. No. 6,953,239 and U.S. patent application Ser. No. 10/461,951, filed on Jun. 13, 2003, titled "Print Cartridge," having inventors Jay S. Gondek, Matthew A. Shepard, Morgan T. Schramm, and John F. Meyer, now U.S. Pat. No. 7,036,919.

BACKGROUND

Colors are defined by light wavelengths. A particular set of wavelengths of light corresponds to one true color. Representing an image, however, as a collection of light wavelengths is often inconvenient for image processing. Therefore, a variety of systems have been developed to represent images in data formats that are more convenient for storing, displaying, and otherwise manipulating images. Each of these systems can be referred to as a color space. Different devices often use different color spaces. Color space conversion is the process of converting an image from one color space to another.

Color spaces can be quite large. For example, display devices, such as computer monitors, televisions, and projectors, often use mixtures of red (R), green (G), and blue (B) color components, or "primaries." The color of each pixel displayed on a screen can be defined as some combination of these RGB primaries. If each color in an RGB color space is represented, for example, using 8-bits per primary or "channel", then each pixel in an image may comprise three bytes of color information. In which case, this 8-bit/channel RGB color space can theoretically display $2^{24}$, or about 16.77 million, different colors.

Mapping in excess of 16 million data points from one color space to another can be time consuming and resource intensive. Therefore, many color conversion techniques rely on interpolation. To interpolate data points, a certain number of data points are first mapped from one color space to another using any of a number of mathematical or experimental approaches. These data points comprise a set of "control points," having predetermined values in both color spaces. Then, when a data point is encountered that has not already been mapped, a value for the data point in the second color space can be estimated based on the position of the data point relative to the control points in the first color space.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

In the following detailed description, numerous specific details are set forth in order to provide a thorough understanding of the embodiments of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful for understanding the embodiments of the present invention. However, the order of description should not be construed as to imply that these operations are necessarily performed in the order they are presented, nor even order dependent. Lastly, repeated usage of the phrase "in one embodiment" does not necessarily refer to the same embodiment, although it may.

Various embodiments of the present invention provide a technique for color space conversion and interpolation. Embodiments of the present invention use one or more colorant boundaries that define boundary surfaces and/or regions in a first color space to limit certain colorants or sub-colorants in a second color space. As discussed below, embodiments of the present invention can be used for a variety of applications, including 100% gray component replacement (GCR) with multiple levels of gray colorant.

Figure 1:
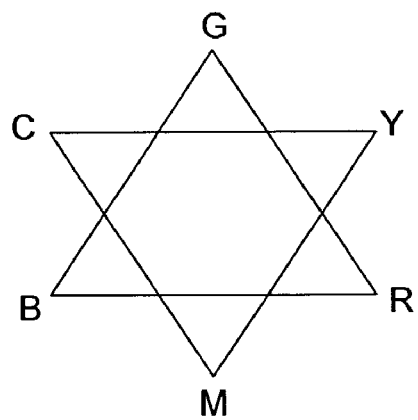
FIG. 1 illustrates one embodiment of color correspondences.

FIG. 1 illustrates one embodiment of color correspondences between a red, green, and blue (RGB) color space and a cyan, magenta, and yellow (CMY) color space. Although embodiments of the present invention are described below primarily with respect to color conversions between RGB and various forms of CMY color spaces, the embodiments of the present invention are not limited to the illustrated color conversions and can be used for color conversions between any of a variety of color spaces.

Computer monitors, televisions, and projectors usually generate color using red, green, and blue light, so these display devices often use RGB color spaces. Imaging devices, such as color printers, do not usually generate light, but instead print reflective colorants, such as cyan, magenta, and yellow, so these display devices often use CMY color spaces. An RGB to CMY color conversion is likely to occur each time a color document is printed from a computer.

As shown in FIG. 1, a combination of M and Y, with no C, produces R. Similarly, a combination of Y and C, with no M, produces G. And, a combination of C and M, with no Y, produces B. Using this type of color correspondence, a color space can be created to map RGB to CMY. For a conversion from RGB to CMY, the RGB colorants are often referred to as secondary colorants and the CMY colorants are often referred to as primary colorants.

Figure 2:
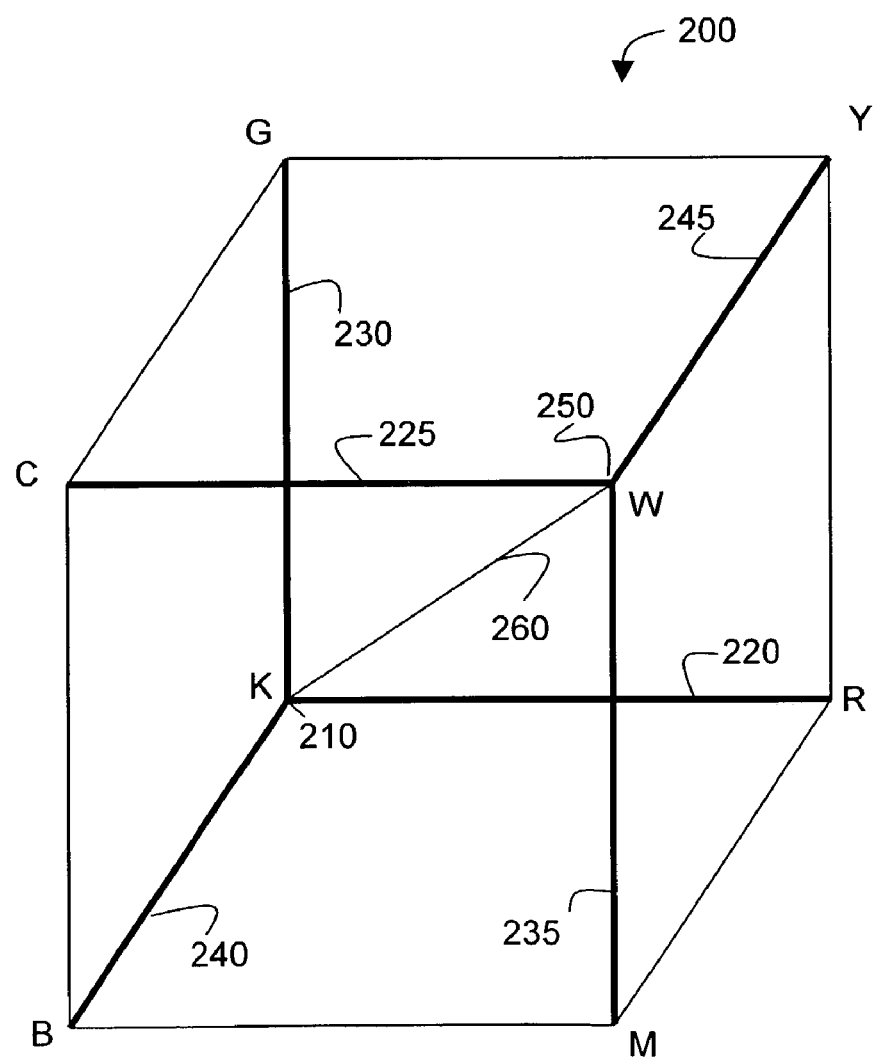
FIG. 2 illustrates one embodiment of an RGB color space.

FIG. 2 illustrates one embodiment of a color cube 200 for mapping RGB and CMY colors. Cube 200 has an origin 210, and three primary axes 220, 230, and 240, one for each of the RGB colors. Axis 220 is a color transition for R intensity, ranging from zero at the origin 210 up to a maximum. Axis 230 similarly corresponds to G intensity, and axis 240 similarly corresponds to B intensity. The origin 210 is black (K), where RGB are all zero. Where RGB are all maximum, the color is white (W) at point 250.

Cube 200 similarly includes a coordinate system for the CMY colors inverted over the RGB coordinate system. That is, the W point 250 is the origin for the CMY colors where CMY are all zero, and the K point 210 is where CMY are all maximum. The CMY colors have three primary axes, 225, 235, and 245. Axis 225 is a color transition for C intensity, ranging from a minimum at point 250 up to a maximum. C intensity is inversely related to R intensity on axis 220. Similarly, axis 235 corresponds to M intensity, and is inversely related to G intensity on axis 230. And, axis 245 corresponds to Y intensity, and is inversely related to B intensity on axis 240.

In the ideal situation, there would be a one-to-one, linear correspondence between the two coordinate systems, and converting RGB to CMY would simply be a matter converting a point in the RGB coordinate system to the same point in the CMY coordinate system. In reality, however, converting between RGB and CMY color spaces can be much more complicated due to various factors that make a one-to-one, linear correspondence between the two coordinate systems very unlikely.

The colorants, the print mechanism, and the print medium are all examples of factors that can complicate how an RGB color space maps to a CMY color space. For example, toners, inks, and waxes are often used as colorants in CMY color spaces. Each colorant, or sub-colorant, is usually comprised entirely of one particular color intensity, or shade of color. For the case in which the colorant is a liquid colorant, the density of tiny droplets of the colorant can be changed in order to change the appearance of the color's intensity. That is, each droplet of a colorant may be the same intensity, but depending on how many droplets are deposited in a given area, the colorant appears more or less intense. The high end of the intensity range for a given colorant is often where the print medium becomes saturated with the colorant and the intensity cannot be increased. The low end of the intensity range for a given colorant is often where the droplets are scattered so sparsely so as to be individually distinguishable to the naked eye, potentially making the image look grainy. The intensity ranges of just C, M, and Y colorants alone are often inadequate to fully represent the intensity ranges of RGB colorants.

One way to increase the intensity ranges is to use additional colorants and/or sub-colorants. For instance, a CMYK color space adds a black (K) colorant. In a CMYK color space, K can be used to make darker colors, potentially increasing the intensity range. A CMYKlclm color space adds a cyan sub-colorant, low-dye cyan (lc), and a magenta sub-colorant, low-dye magenta (lm). lc and lm can be used to smooth out the lighter colors, also potentially increasing the intensity range. Various embodiments of the present invention also use a CMYlclmKgGrz color space which adds three sub-colorants of gray, light gray (g), medium gray (Gr), and black (z). K and z may represent two different types of black for different types of images, such as text verses photographs.

As used herein, the word "colorant" refers to a particular general color, such as red (R), green (G), blue (B), cyan (C), magenta (M), yellow (Y), black (K), and gray. Colorants can include various sub-colorants, such as dark cyan (C) and light cyan (lc) for cyan, dark magenta (M) and light magenta (lm) for magenta, and light gray (g), medium gray (Gr), and black (z) for gray. Note that a capital letter designation can be used to refer to either a particular general color, as in the CMY colorants, or a darker shade of a particular color, as in a dark cyan (C) sub-colorant and a dark magenta (M) sub-colorant.

In the color cube of FIG. 2, it may be desirable to limit darker colorants to regions of darker true colors near the origin 210. Otherwise, in lighter regions, the darker colorants will likely be so sparsely scattered that the image will appear grainy. Limiting colorants in this way is often referred to as color separation.

A subset of color conversions can be stored in the look-up table (LUT), and then an interpolation approach can be used to estimate color conversions for additional data points based on the data points in the table. In one embodiment, conversions are calculated for a set of control points. Control points are often selected along at least 13 control lines in a color space. The color space in FIG. 2 shows one of the control lines, control line 260. Control line 260 extends between the K point 210 and the W point 250. Control line 260 is referred to as the neutral control line, or neutral axis, because it passes through the middle of the color space. Data points along the neutral axis represent shades of gray, ranging from black (K) at 210 out to white (W) at 250.

Figure 3:
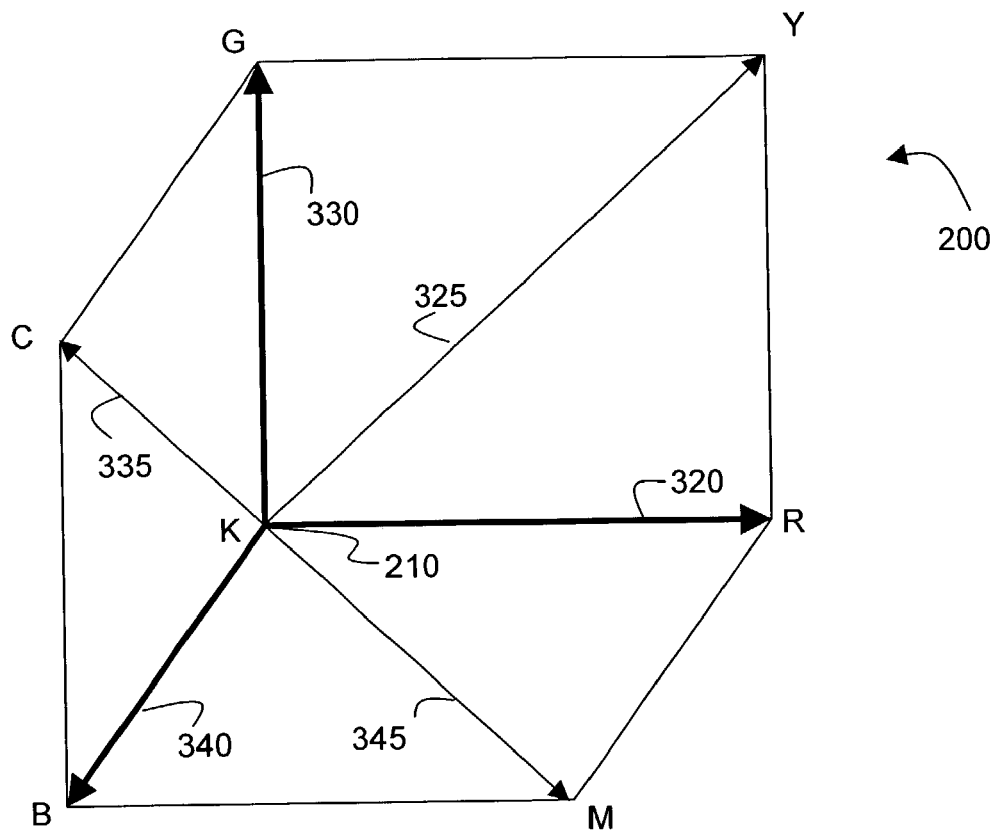
FIG. 3 illustrates one embodiment of a partial set of control lines.
Figure 4:
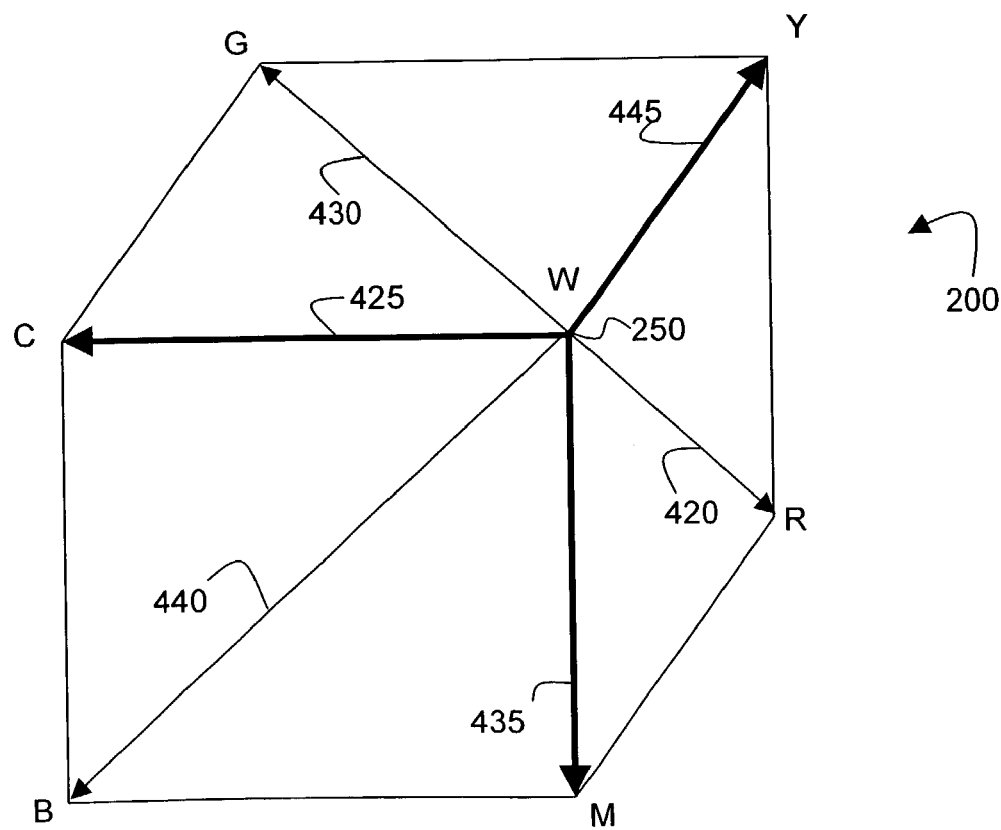
FIG. 4 illustrates one embodiment of another partial set of control lines.

Twelve more control lines are illustrated in FIGS. 3 and 4. In FIG. 3, six control lines, 320, 330, 340, 335, 345, and 325, extend from the K point 210 to each of the six colorants RGB and CMY, respectively. In FIG. 4, six control lines, 420, 430, 440, 425, 435, and 445, similarly extend from the W point 250 to each of the six colorants RGB and CMY, respectively.

Figure 5:
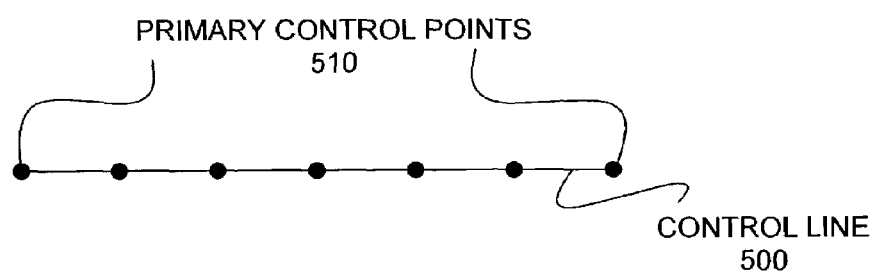
FIG. 5 illustrates one embodiment of control points along a control line.

FIG. 5 illustrates one embodiment of control points 510 on a control line 500. Control line 500 has control points 510 at particular intervals over the length of the control line.

Table 1 below illustrates a LUT for an RGB to CMY color conversion for various control points. The CMY color space comprises CMYlclmKgGz channels, with 8-bits per channel. The position of each control point in the RGB space is indicated as a number of steps or intervals along each of the three RGB axes from the black (K) origin at 0, 0, 0 out to white (W) at 16, 16, 16. In the CMY color space, various sub-colorants are limited by a number of colorant boundaries. Specifically:

Gr bound 12, z bound 8, and

CM bound 8.

This set of colorant boundaries is defined in terms of steps away from the RGB origin at 0, 0, 0. "Gr bound 12" indicates that medium gray (Gr) is bounded at the twelfth step away from the origin along the gray axis, or neutral axis, from K to W. "z bound 8" indicates that black (z) is bounded at the eighth step away from the origin along the neutral axis from K to W. "CM bound 8" indicates that both dark cyan (C) and dark magenta (M) are bounded at the eighth step away from the origin in the directions of the cyan and magenta transitions, C to W and M to W, respectively. In other embodiments, any number of approaches can be used to define a LUT and colorant boundaries within the LUT.

TABLE 1

| R | G | B | C | M | Y | lc | lm | K | g | Gr | z |
|---|---|---|---|---|---|---|---|---|---|---|---|
| black to white ||||||||||||
| 0 | 0 | 0 | 0 | 0 | 0 | 0 | 0 | 0 | 0 | 150 | 255 |
| 2 | 2 | 2 | 0 | 0 | 0 | 0 | 0 | 0 | 0 | 210 | 180 |
| 4 | 4 | 4 | 0 | 0 | 0 | 0 | 0 | 0 | 0 | 230 | 120 |
| 6 | 6 | 6 | 0 | 0 | 0 | 0 | 0 | 0 | 100 | 255 | 0 |
| 8 | 8 | 8 | 0 | 0 | 0 | 0 | 0 | 0 | 150 | 160 | 0 |
| 12 | 12 | 12 | 0 | 0 | 0 | 0 | 0 | 0 | 250 | 0 | 0 |
| 16 | 16 | 16 | 0 | 0 | 0 | 0 | 0 | 0 | 0 | 0 | 0 |
| white to red to black ||||||||||||
| 16 | 13 | 13 | 0 | 0 | 39 | 0 | 68 | 0 | 0 | 0 | 0 |
| 16 | 8 | 8 | 0 | 0 | 120 | 0 | 255 | 0 | 0 | 0 | 0 |
| 16 | 4 | 4 | 0 | 140 | 170 | 0 | 200 | 0 | 0 | 0 | 0 |
| 16 | 0 | 0 | 0 | 225 | 245 | 0 | 0 | 0 | 0 | 0 | 0 |
| 12 | 0 | 0 | 0 | 225 | 245 | 0 | 0 | 0 | 100 | 0 | 0 |
| 8 | 0 | 0 | 0 | 225 | 235 | 0 | 0 | 0 | 60 | 160 | 0 |
| 4 | 0 | 0 | 0 | 225 | 235 | 0 | 0 | 0 | 0 | 160 | 100 |
| 1 | 0 | 0 | 0 | 205 | 220 | 0 | 0 | 0 | 0 | 160 | 190 |
| white to green to black ||||||||||||
| 13 | 16 | 13 | 0 | 0 | 40 | 68 | 0 | 0 | 0 | 0 | 0 |
| 8 | 16 | 8 | 0 | 0 | 150 | 255 | 0 | 0 | 0 | 0 | 0 |
| 4 | 16 | 4 | 125 | 0 | 170 | 200 | 0 | 0 | 0 | 0 | 0 |
| 0 | 16 | 0 | 234 | 0 | 234 | 0 | 0 | 0 | 0 | 0 | 0 |
| 0 | 12 | 0 | 234 | 0 | 234 | 0 | 0 | 0 | 0 | 40 | 0 |
| 0 | 8 | 0 | 224 | 0 | 224 | 0 | 0 | 0 | 0 | 160 | 0 |
| 0 | 1 | 0 | 224 | 0 | 224 | 0 | 0 | 0 | 0 | 160 | 190 |
| white to blue to black ||||||||||||
| 13 | 13 | 16 | 0 | 0 | 0 | 64 | 55 | 0 | 0 | 0 | 0 |
| 8 | 8 | 16 | 0 | 0 | 0 | 255 | 220 | 0 | 0 | 0 | 0 |
| 4 | 4 | 16 | 150 | 125 | 0 | 180 | 130 | 0 | 0 | 0 | 0 |
| 0 | 0 | 16 | 230 | 190 | 0 | 0 | 0 | 0 | 0 | 0 | 0 |
| 0 | 0 | 12 | 220 | 190 | 0 | 0 | 0 | 0 | 0 | 40 | 0 |
| 0 | 0 | 8 | 220 | 185 | 0 | 0 | 0 | 0 | 0 | 160 | 0 |
| 0 | 0 | 1 | 215 | 180 | 0 | 0 | 0 | 0 | 0 | 160 | 190 |
| white to yellow to black ||||||||||||
| 16 | 16 | 0 | 0 | 0 | 250 | 0 | 0 | 0 | 0 | 0 | 0 |
| 12 | 12 | 0 | 0 | 0 | 250 | 0 | 0 | 0 | 200 | 0 | 0 |
| 8 | 8 | 0 | 0 | 0 | 240 | 0 | 0 | 0 | 120 | 150 | 0 |
| 4 | 4 | 0 | 0 | 0 | 240 | 0 | 0 | 0 | 34 | 215 | 109 |
| 1 | 1 | 0 | 0 | 0 | 240 | 0 | 0 | 0 | 0 | 220 | 190 |
| white to mgta to black ||||||||||||
| 16 | 13 | 16 | 0 | 0 | 0 | 0 | 60 | 0 | 0 | 0 | 0 |
| 16 | 8 | 16 | 0 | 0 | 0 | 0 | 255 | 0 | 0 | 0 | 0 |
| 16 | 4 | 16 | 0 | 180 | 0 | 0 | 200 | 0 | 0 | 0 | 0 |
| 16 | 0 | 16 | 0 | 255 | 0 | 0 | 0 | 0 | 0 | 0 | 0 |
| 12 | 0 | 12 | 0 | 255 | 0 | 0 | 0 | 0 | 128 | 0 | 0 |

TABLE 1-continued

| R | G | B | C | M | Y | Ic | Im | K | g | Gr | z |
|---|---|---|---|---|---|----|----|---|---|----|----|
| 8 | 0 | 8 | 0 | 255 | 0 | 0 | 0 | 0 | 80 | 180 | 0 |
| 1 | 0 | 1 | 0 | 255 | 0 | 0 | 0 | 0 | 0 | 180 | 190 |
| white to cyan to black | | | | | | | | | | | |
| 13 | 16 | 16 | 0 | 0 | 0 | 60 | 0 | 0 | 0 | 0 | 0 |
| 8 | 16 | 16 | 0 | 0 | 0 | 255 | 0 | 0 | 0 | 0 | 0 |
| 4 | 16 | 16 | 180 | 0 | 0 | 180 | 0 | 0 | 0 | 0 | 0 |
| 0 | 16 | 16 | 255 | 0 | 0 | 0 | 0 | 0 | 0 | 0 | 0 |
| 0 | 12 | 12 | 255 | 0 | 0 | 0 | 0 | 0 | 0 | 50 | 0 |
| 0 | 8 | 8 | 255 | 0 | 0 | 0 | 0 | 0 | 0 | 180 | 0 |
| 0 | 1 | 1 | 255 | 0 | 0 | 0 | 0 | 0 | 0 | 180 | 190 |
| yellow to red | | | | | | | | | | | |
| 16 | 8 | 0 | 0 | 0 | 220 | 0 | 255 | 0 | 0 | 0 | 0 |
| yellow to green | | | | | | | | | | | |
| 8 | 16 | 0 | 0 | 0 | 230 | 230 | 0 | 0 | 0 | 0 | 0 |
| cyan to blue | | | | | | | | | | | |
| 0 | 8 | 16 | 255 | 0 | 0 | 0 | 220 | 0 | 0 | 0 | 0 |
| mgta to blue | | | | | | | | | | | |
| 8 | 0 | 16 | 0 | 230 | 0 | 255 | 0 | 0 | 0 | 0 | 0 |

Entries in Table 1 are organized into a number of transitions, starting with control points along the neutral axis from black to white. The next set of entries define additional control points along the white to red, and red to black, control lines. Subsequent sets of entries define additional control points along control lines for white to green to black, white to blue to black, white to yellow to black, white to magenta to black, white to cyan to black. In addition to control points along these 13 control lines, Table 1 also defines some control points along control lines from yellow to red, yellow to green, cyan to blue, and magenta to blue.

Figure 6:
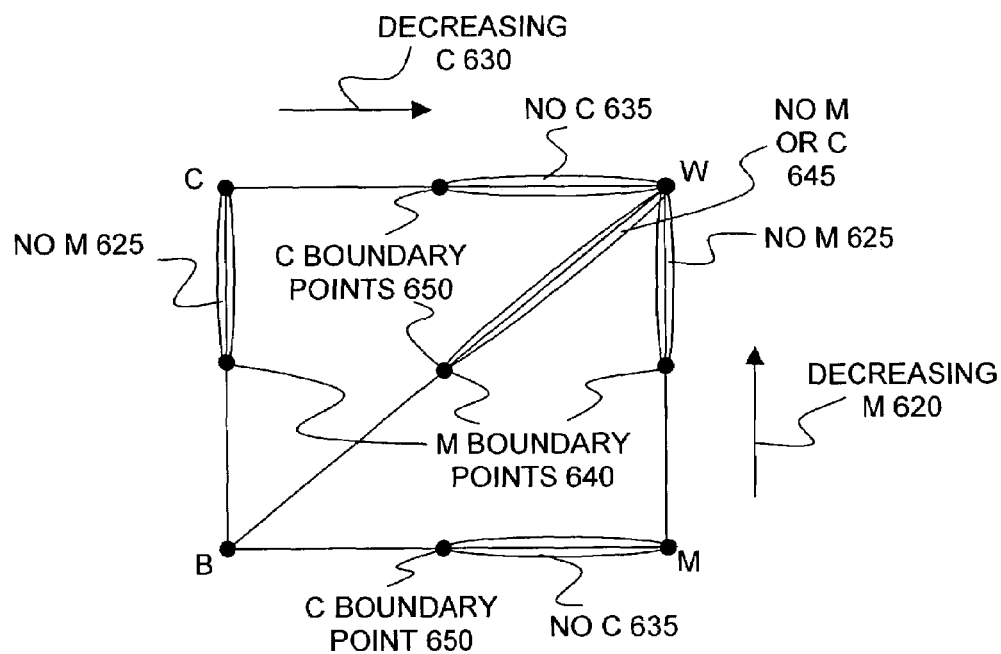
FIG. 6 illustrates one embodiment of boundary points on a surface.

The colorant boundaries define boundary points along many of the transitions for certain colorants. For instance, FIG. 6 illustrates the transitions defined by Table 1 for one surface of the color cube, surface CWMB, where B is 16 in the RGB space. Surface CWMB comprises five control lines, CW, WM, MB, BC, and WB. In the direction of decreasing C intensity 630, C is bounded at step 8. So, each control line crossing step 8 in the direction 630 includes a C boundary point 650. In the direction of decreasing M intensity 620, M is also bounded at step 8. So, each control line crossing step 8 in the direction 620 includes an M boundary point 640.

In the illustrated embodiment, a boundary point is defined to include none of the colorant or sub-colorant being bounded. Furthermore, steps beyond the boundary point along a given transition in Table 1 are also defined to include none of the colorant or sub-colorant being bounded. So, in FIG. 6, control points along segments 635 include no C, control points along segments 625 include no M, and control points along segment 645 include neither C nor M.

Figure 7:
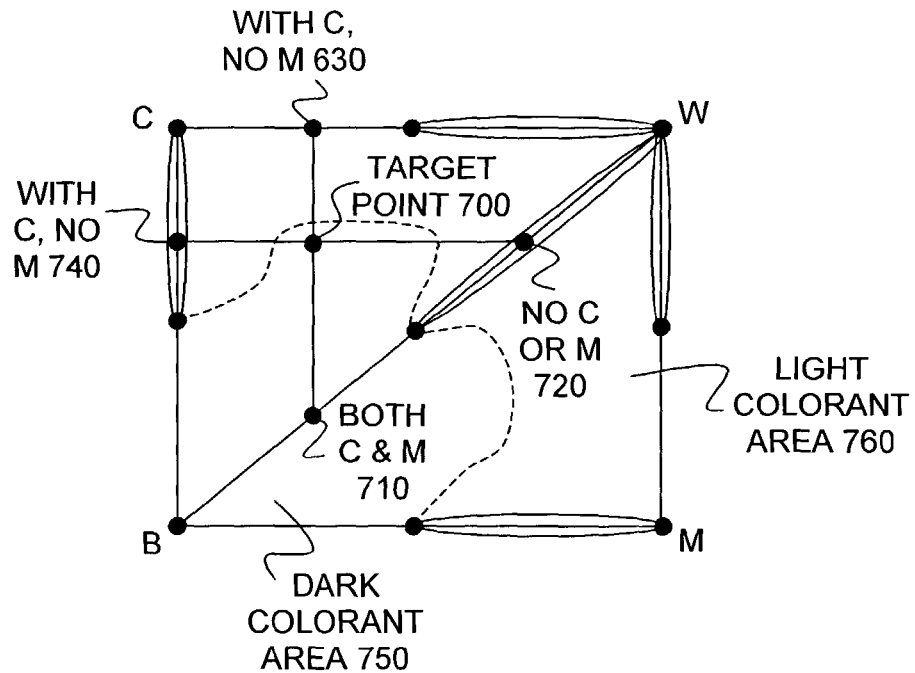
FIG. 7 illustrates one embodiment of interpolation from control points.

The set of control points defined in Table 1 can be used to interpolate the values of other points. FIG. 7 illustrates one embodiment of an interpolation for a target point 700 from the control points of Table 1. A set of interpolation points 710, 720, 730, and 740 are identified by extending out from control point 700 to the transitions defined in Table 1. If an interpolation point is a control point that has been previously defined in Table 1, the value of the control point in the CMY color space can be taken from the table. If, however, an interpolation point falls between two control points on a transition, the value of the interpolation point itself can be interpolated using, for instance, any of a variety of one-dimensional interpolations based on the values of neighboring control points on the control line.

A one-dimensional interpolation is usually some form of distance weighted average of the values of the linear neighbors. By defining a boundary point to include none of the colorant or sub-colorant being bounded, any interpolation point on a transition beyond a boundary point will also include none of the colorant or sub-colorant being bounded. For instance, point 710 can include both C and M because point 710 is before the boundary point. Point 720, however, will not include C or M, and points 730 and 740 will not include M but may include C.

Once the values of all the interpolation points are defined, the value of target point 700 can be determined using, for instance, any of a variety of two-dimensional interpolations. Since some of the interpolation points can include C and M, target point 700 can also include both C and M.

The colorant boundaries are intended to constrain the darker colorants to the darker regions of the color space. If darker colorants are allowed into lighter regions, the darker colorants are too often sparsely distributed in the lighter regions, causing the image to look grainy. Merely defining boundary points based on the colorant boundaries, however, may be inadequate to reduce or eliminate graininess. That is, the darker colorant area 750 where darker colorants are used may extend deeply into the light colorant area 760.

Figure 8:
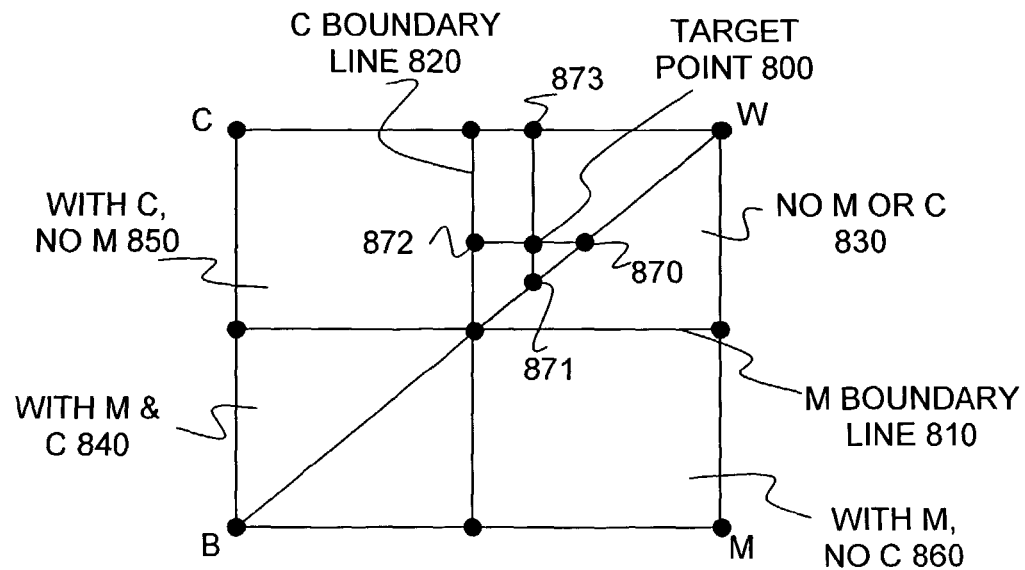
FIG. 8 illustrates one embodiment of interpolation using boundary surfaces.

Therefore, embodiments of the present invention use the colorant boundaries to define boundary surfaces in the RGB color space. FIG. 8 illustrates one embodiment of edges of these boundary surfaces. A path is formed through the color space to connect bounding points corresponding to the M colorant boundary into M boundary line 810. Another path is formed to connect bounding points corresponding to the C colorant boundary into C boundary line 820.

When interpolating target point 800, the set of interpolation points 870, 871, 872, and 873 are taken from control lines or from the boundary lines, whichever is encountered first. If any of the interpolation points are not already available in Table 1, they can be linearly interpolated from the predetermined values in Table 1. Since boundary points are defined to include none of the colorant or sub-colorant being bounded, points interpolated along a boundary line based on the boundary points at either end will similarly include none of the colorant or sub-colorant being bounded. Since the boundary lines are limited in this way, points on the surface past the boundaries lines will also include none of the colorant or sub-colorant being bounded. In other words, boundary lines 810 and 820 divide the surface CWMB into four regions, region 830 with no C or M, region 840 with both C and M, region 850 with C but no M, and region 860 with M but no C. The dark colorants are not permitted to extend into the lighter regions of the color space.

Figure 9:
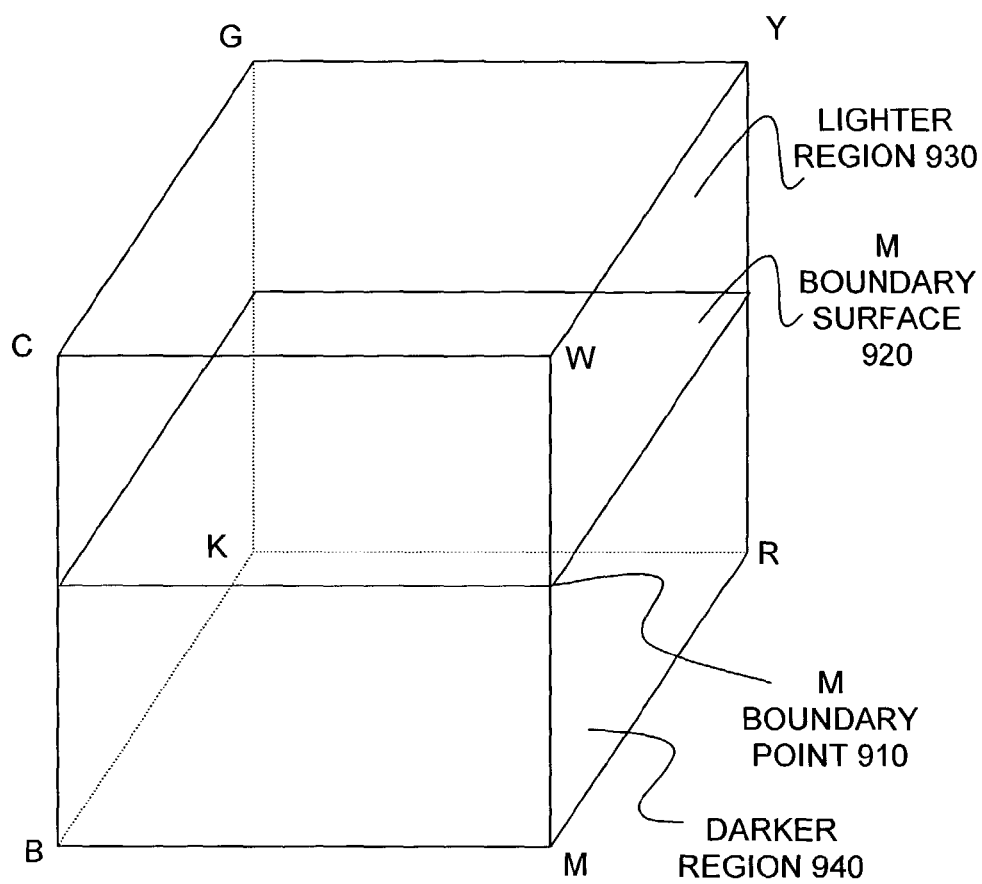
FIG. 9 illustrates one embodiment of a M boundary surface.

Boundary lines for a particular colorant boundary can be extended into higher dimensions to form boundary surfaces. For instance, FIG. 9 illustrates one embodiment of an M boundary surface 920. That is, just as boundary line 810 was formed in FIG. 8 for surface CWMB, additional boundary lines can be formed in surfaces WYRM, GYRK, and CGKB based on the M boundary point 910. The four boundary lines comprise the edges of M boundary surface 920. Points on surface 920 can be interpolated using any of a variety of two-dimensional interpolation techniques based on the boundary points along the edges of surface 920. Since all points around the edges of surface 920 include no M colorant, no point on surface 920 will include M either.

When interpolating points below surface 920, the sets of interpolation points will only include points below or on surface 920. When interpolating points above surface 920, the sets of interpolation points will only include points above or on surface 920. Since surface 920 includes no M colorant, no point above surface 920 will include M either. In other words, surface 920 divides the color space into lighter region 930 where M is not used and a darker region 940 where M can be used.

Figure 10:
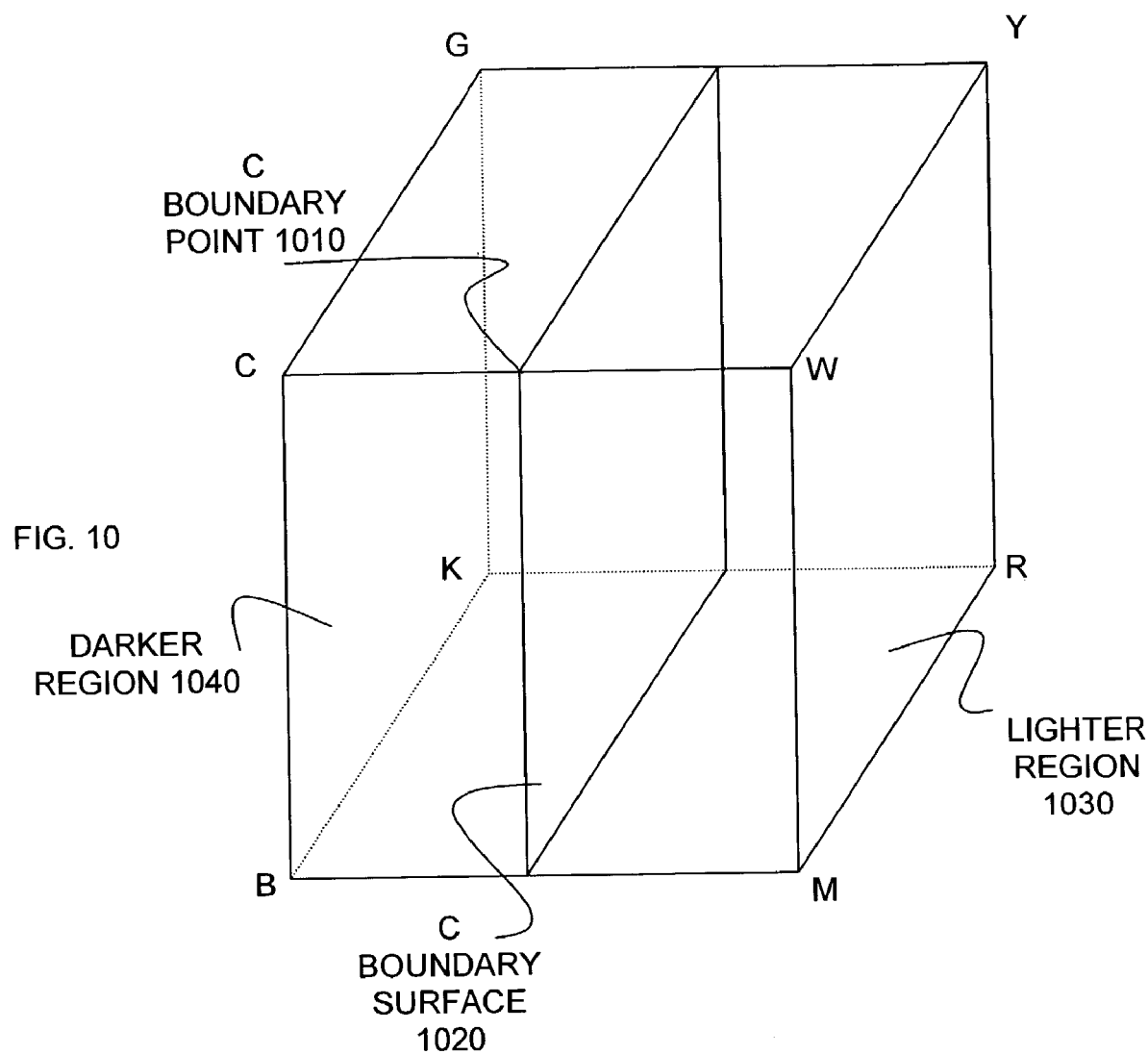
FIG. 10 illustrates one embodiment of a C boundary surface.

FIG. 10 illustrates one embodiment of a C boundary surface 1020 that is formed based on a C boundary point 1010 much like the M boundary surface 920 from FIG. 9. Like surface 920, surface 1020 divides the color space into a lighter region 1030 where C will not be used and a darker region 1040 where C can be used.

Figure 11:
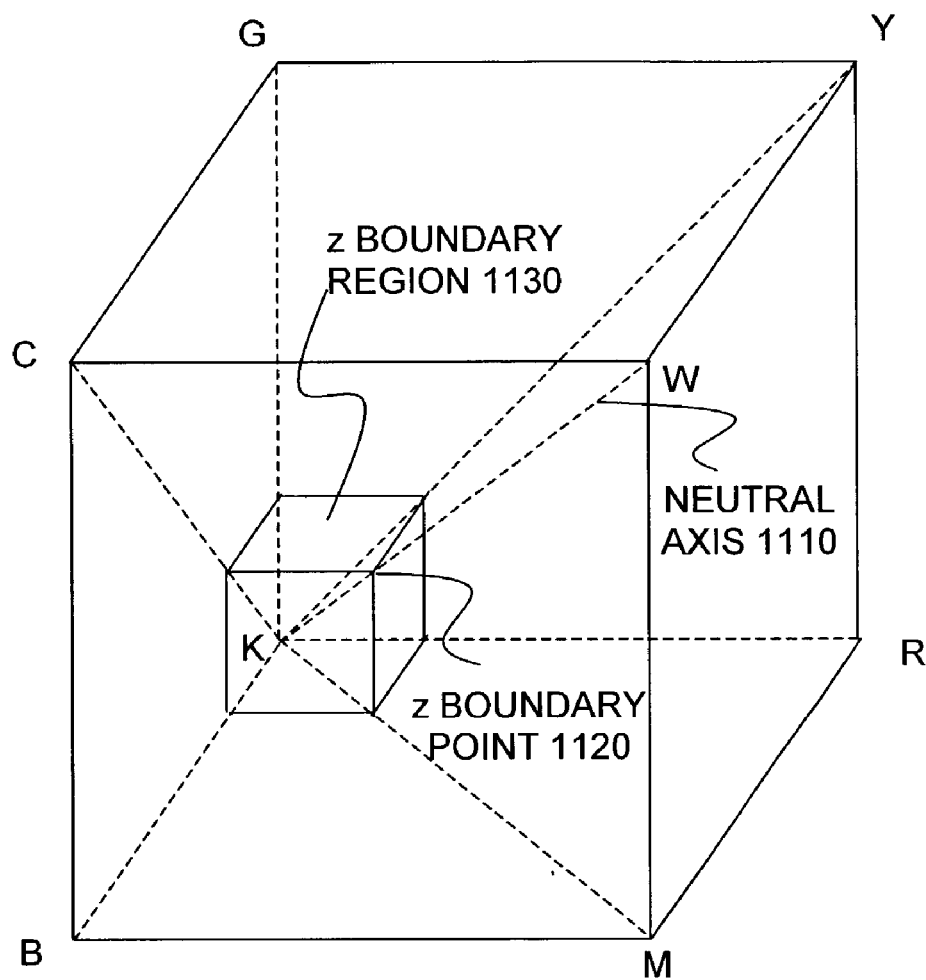
FIG. 11 illustrates one embodiment of a z boundary region.

In addition to boundary surfaces that span the entire color space, embodiments of the present invention can also form smaller boundary surfaces within a color space, and piece those smaller boundary surfaces into three-dimensional boundary regions. For instance, FIG. 11 illustrates one embodiment of a boundary region defined by the black (z) colorant boundary from Table 1. Unlike the C colorant boundary that bounded C only in the direction of decreasing C intensity, the z colorant boundary can be defined to bound z in the direction of decreasing gray intensity. In other words, a z boundary point 1120 can be located on each transition out from the origin, including the neutral axis 1110. Edges and surfaces can then be formed by connecting the boundary points. The surfaces collectively form the boundary region 1130. Since the colorant boundary is at the same step location on each transition out from the origin, boundary region 1130 is a cube. With each z boundary point defined to include no z sub-colorant, the edges, surfaces, and exterior volume around boundary region 1130 can similarly be interpolated to include no z sub-colorant.

Figure 12:
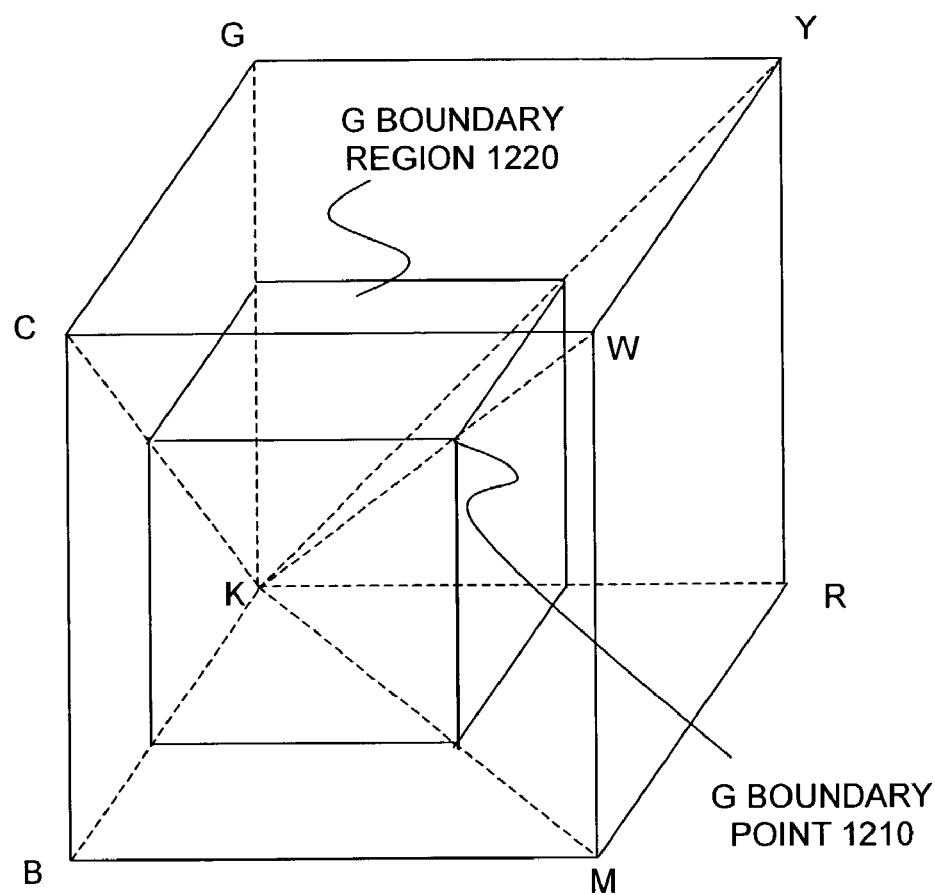
FIG. 12 illustrates one embodiment of a Gr boundary region.

FIG. 12 illustrates one embodiment of a boundary region defined by the medium gray (Gr) colorant boundary from Table 1. As with the z boundary region, Gr boundary points 1210 can be located on each transition out from the origin, and edges and surfaces can then be formed by connecting the boundary points. The surfaces collectively form the boundary region 1220. With each Gr boundary point defined to include no Gr sub-colorant, the edges, surfaces, and exterior volume around boundary region 1220 can similarly be interpolated to include no z sub-colorant.

Figure 13:
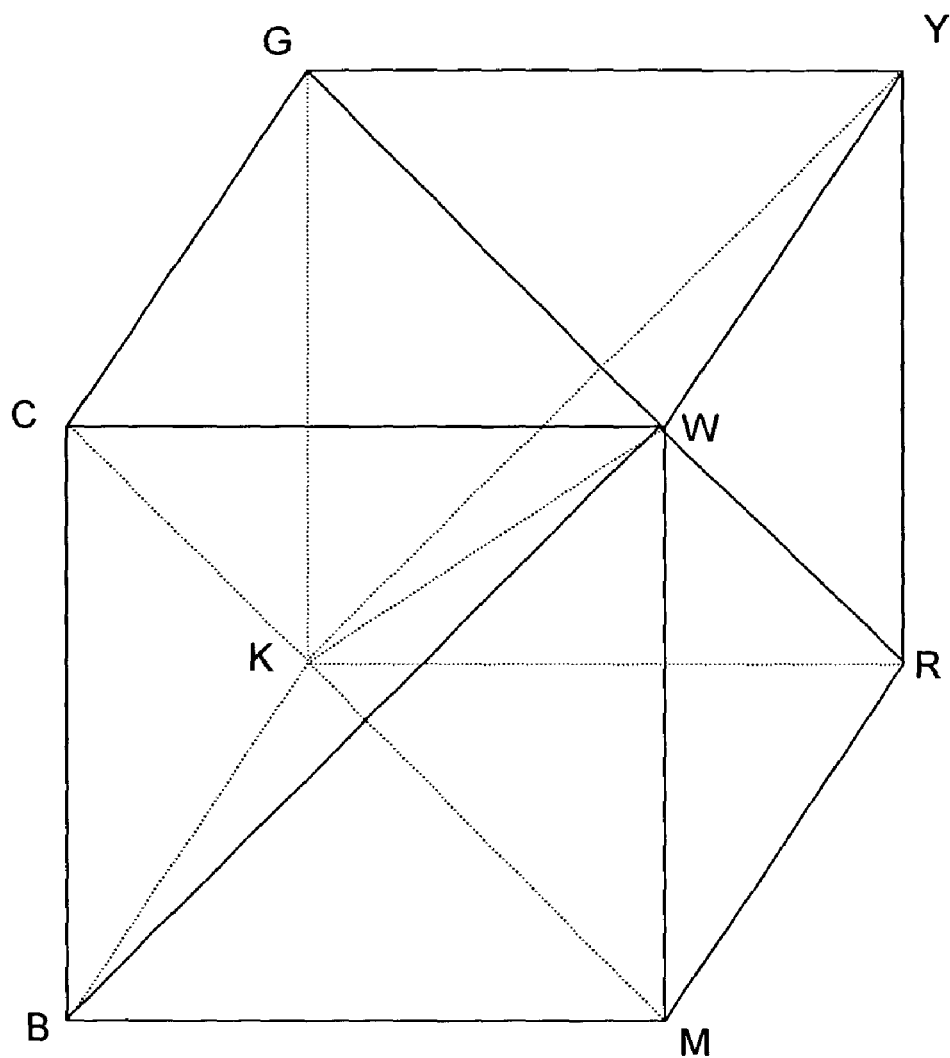
FIG. 13 illustrates one embodiment of control lines defining tetrahedra.

In some embodiments of the present invention, certain points are stored as they are interpolated so that they can be used along with the control points for future color conversions. These points can be, for example, various points on the surfaces defined by the control lines. FIG. 13 illustrates 19 control lines in a color cube, lines KR, KG, KB, KC, KM, KY, KW, WR, WG, WB, WC, WM, WY, CG, GY, YR, RM, MB, and BC. The 19 control lines divide the color cube into six tetrahedra, KWMR, KWBM, KWCB, KWGC, KWYG, and KWRY. Each tetrahedron includes four triangular surfaces bounded by the neutral axis KW, one primary colorant corner, C, M, or Y, and one secondary colorant corner, R, G, or B.

Figure 14:
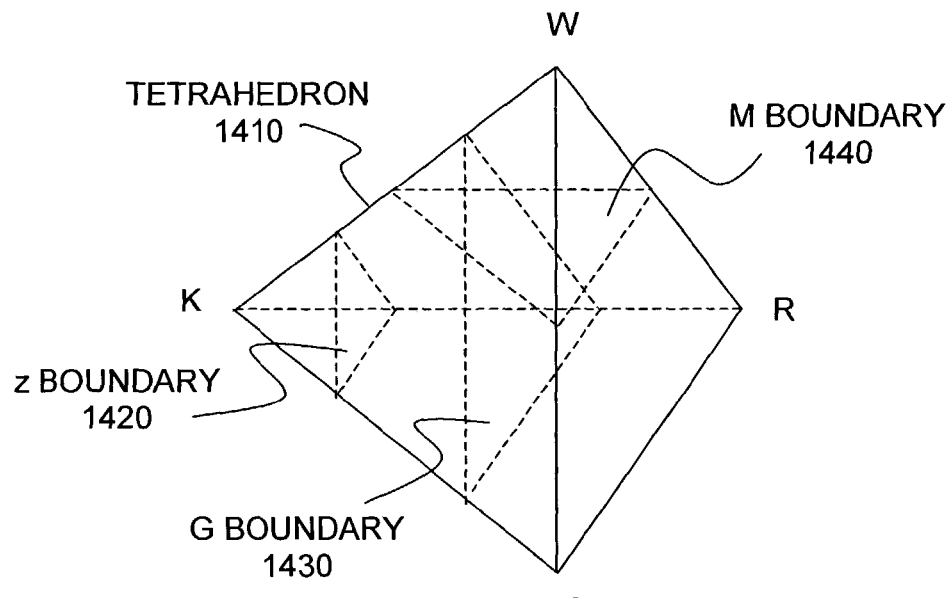
FIG. 14 illustrates one embodiment of boundary surfaces in a tetrahedra.

FIG. 14 illustrates the KWMR tetrahedron 1410 defined by control lines KW, WR, RM, MK, and WM. Using the colorant boundaries from Table 1, three boundary surfaces, z boundary 1420, Gr boundary 1430, and M boundary 1440, can be defined within tetrahedron 1410. That is, as described above, each boundary surface can be defined by connecting boundary points among neighboring control lines. Boundary points along the edges of each boundary surface can be linearly interpolated from the boundary points at either end of the edges. And, points on the surfaces of tetrahedra 1410 can be interpolated using two-dimensional interpolations based on the control points along the control lines and the boundary points along the boundary edges.

By defining the boundary points on the control lines to include none of the colorant or sub-colorant being bounded, the boundary points on the boundary edges, as well as boundary points within the boundary surfaces, will be similarly limited. By limiting all the edge boundary points, the two-dimensional interpolations on the surfaces of the tetrahedron will lead to areas that are also similarly limited. Then, a three-dimensional interpolation of any point within the tetrahedron that relies on interpolation points from the tetrahedra surfaces and/or boundary surfaces will lead to volumes that are similarly limited as well.

Figure 15:
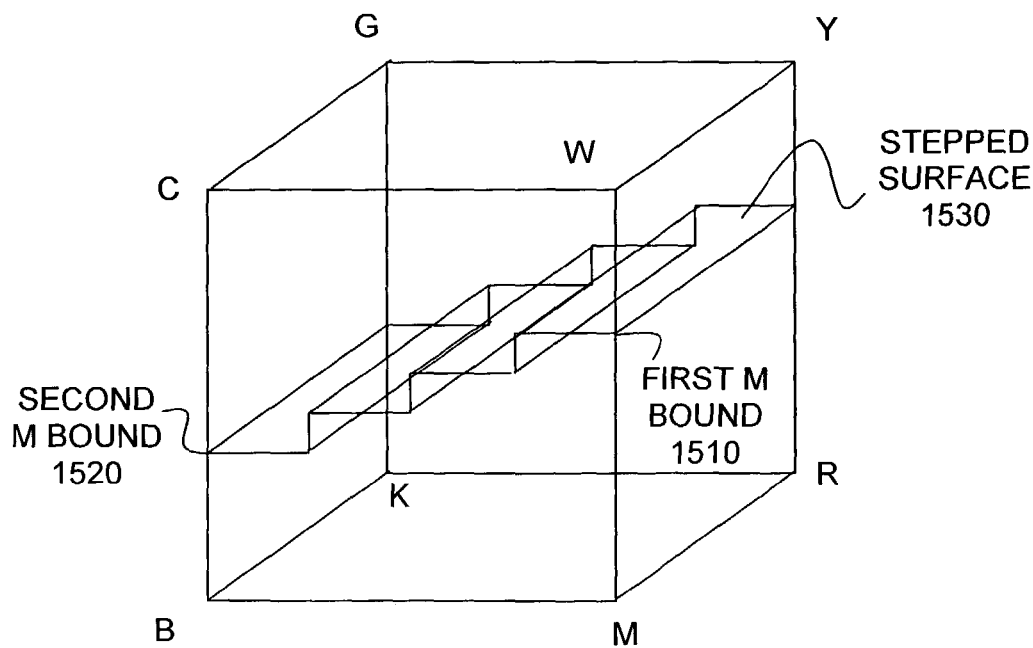
FIG. 15 illustrates one embodiment of a stepped boundary surface.

In other embodiments, any of a variety surface shapes and volumes can be defined using control lines and colorant boundaries. For example, FIG. 15 illustrates one embodiment of a stepped boundary surface 1530. Rather than defining a single boundary for magenta, the illustrated embodiment includes two bounds, bound 1510 and bound 1520. Bound 1510 allows M to be used further along the MW and RY transitions than bound 1520 allows M to be used along the BC and KG transitions. Each step in surface 1530 may correspond to one or more steps or intervals between control points along the BM and MW transitions. Any number of techniques can be used to define the paths connecting the boundary points. For example, a path may take a shortest distance between boundary points on neighboring control lines and may evenly distribute any steps over the path's length.

Figure 16:
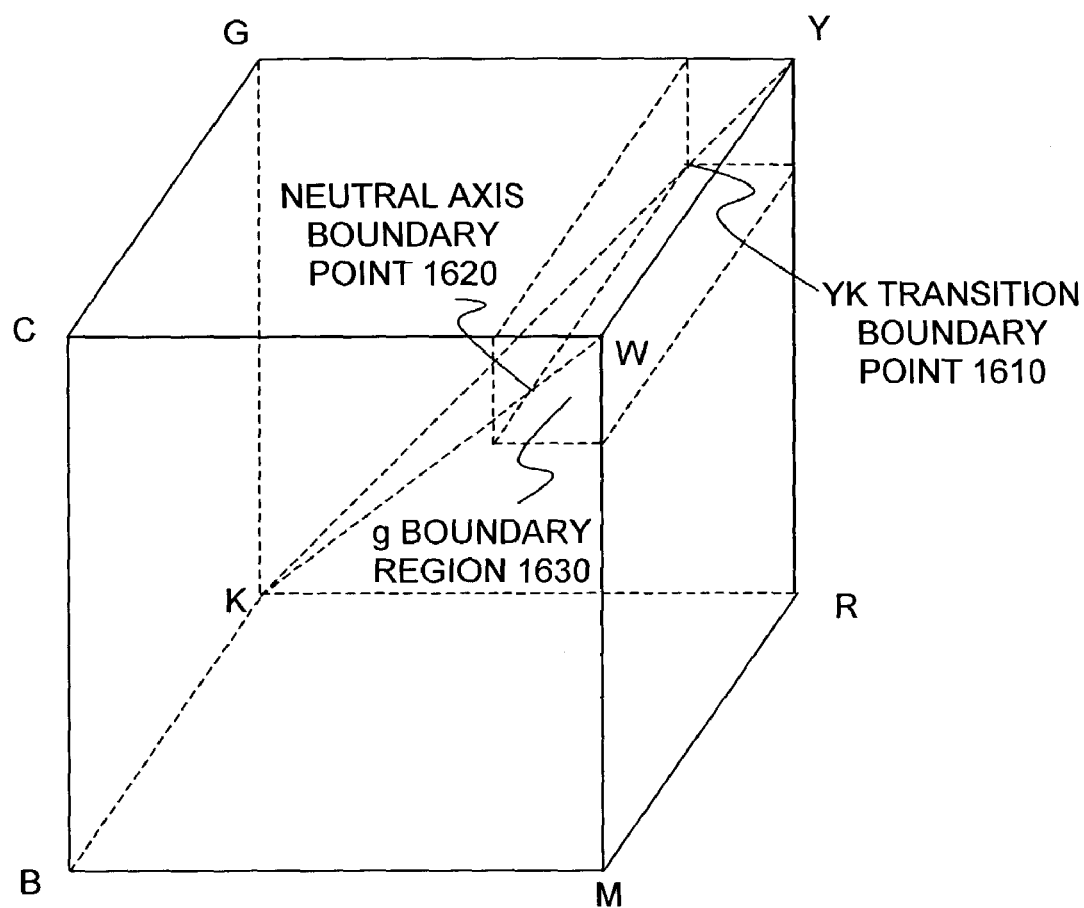
FIG. 16 illustrates one embodiment of a g boundary region.

FIG. 16 illustrates yet another shape for a boundary region. Rather than constraining dark colorants near the origin, light gray (g) boundary region 1630 constrains the g sub-colorant to lighter portions of the color space. This may help conserve g ink, for instance. Without boundary region 1630, g ink may be used for colors throughout the color space, potentially using a disproportionately large amount of g ink compared to other inks.

In the illustrated embodiment, region 1630 can be defined using two components for the colorant boundary. That is, the colorant boundary includes one boundary point 1610 along the YK transition and a second boundary point 1620 along the neutral axis transition. The two boundary points together define the rectangular volume of region 1630.

Figure 17:
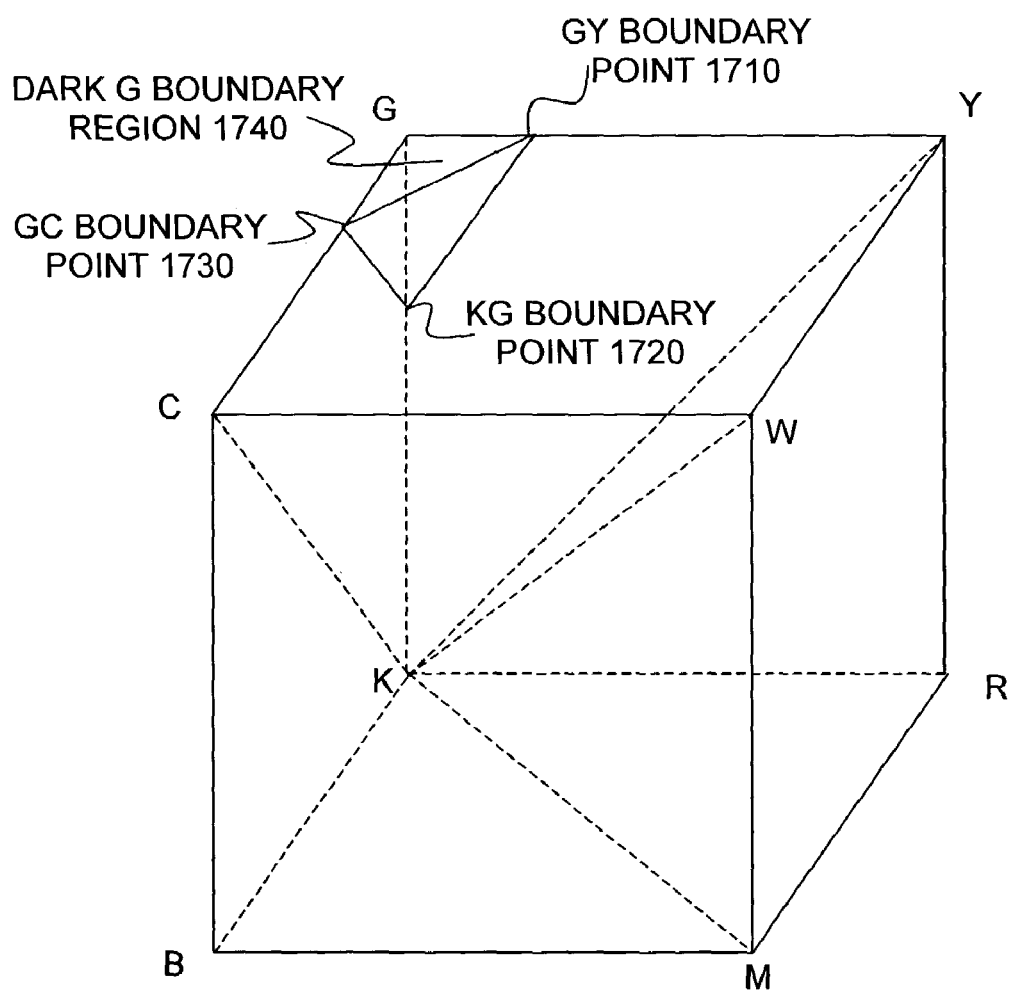
FIG. 17 illustrates one embodiment of a dark green boundary region.

FIG. 17 illustrates yet another shape for a boundary region. FIG. 17 departs from the color space defined by Table 1. The color space of FIG. 17 includes a dark green colorant that is constrained to a region near the G corner of the color space. That is, the dark green colorant boundary comprises three components, boundary point 1710 along the GY transition, boundary 1720 along the GK transition, and boundary 1730 along the GC boundary. As discussed above, the boundary points can be connected to form a boundary surface that defines the dark green boundary region 1740. And, as discussed above, by defining the boundary points to include no dark green, none of the boundary points along the edges or surface of region 1740 will include dark green, effectively constraining the colorant.

In addition to constraining dark colorants to dark regions to reduce graininess, and in addition to constraining light colorants to light regions to conserve ink, embodiments of the present invention can be used for a wide variety of other applications. For instance, various embodiments of the present invention can be used for gray component replacement (GCR).

Figure 18:
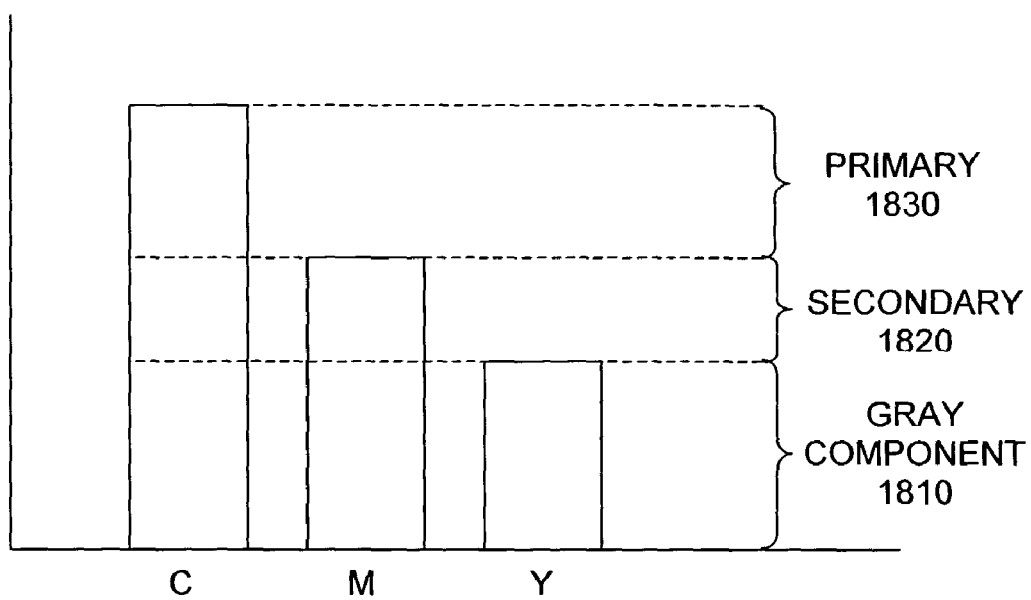
FIG. 18 illustrates one embodiment of gray component.

FIG. 18 illustrates a mixture of C, M, and Y primary colorant intensities for a particular true color. A mixture of equal intensities of C, M, and Y produces a shade of gray, referred to as the gray component 1810. Beyond the gray component 1810, the true color is actually determined by the intensities of just two primary colorants, C and M in the illustrated embodiment.

To the extent that the two primary colorants mix in equal amounts, that portion of the mixture can be referred to the secondary component 1820. The word "secondary" is used because the equal mixture of two primary colorants produces a secondary colorant, R, G, or B. Referring back to FIG. 1, the figure shows that C and M together will produce the secondary colorant B.

To the extent that one primary colorant intensity is higher than any of the others, that portion of the mixture can be referred to as the primary component 1830. Just as every color can be defined as some mixture of C, M, and Y, every color can also be defined as some mixture of gray component, secondary component, and primary component.

In a CMY color space, the gray component can be created using near-equal mixtures of C, M, and Y colorants. Gray component replacement (GCR) is the practice of replacing that equal mixture, at least in part, with a gray colorant, such as black (K). GCR can provide a great many advantages, such as reduced total ink usage, reduced global hue shift, improved metamerism, improved gamut, and increased sharpness.

The gray component is present in colors throughout a color space. If a black colorant is used to replace the gray component everywhere, the black may make lighter regions appear grainy. That is, to provide light intensities of gray using a black colorant, droplets of black will likely be so sparsely dispersed that they are individually discernable to the naked eye. One approach to reducing grain is partial gray component replace. For example, black may be used over only part of the color space and a mixture of lc, lm, and Y may be used elsewhere for lighter shades of gray. As another example, a lighter gray colorant may be used for gray component replacement in lighter regions, and a mixture of C, M, and Y may be used in darker regions. In either situation, grain may be reduced, but many of the advantages of GCR are also diminished.

Therefore, embodiments of the present invention use multiple levels of gray colorant to provide 100% GCR throughout a color space. In other words, embodiments of the present invention can render every color in a CMY color space using no more than two primary colorants plus some amount of two or more levels of gray colorant. A primary colorant in this context includes any and all of its sub-colorants. So, for instance, a shade of green can be rendered using one or more sub-colorants of gray, such as g and Gr for example, and one or more sub-colorants of up to two primary colorants, such as C, lc, and Y for example.

By providing 100% GCR with multiple levels of gray, embodiments of the present invention can reduce or eliminate grain while providing the many advantages afforded by GCR. Grain is reduced by using lighter intensity gray dots in lighter regions of the color space so that dot densities are higher and individual dots are less visible.

Any number of approaches can be used to implement 100% GCR with multiple levels of gray, such as dot replacement rules or the boundary surface approaches described above. For example, dot replacement rules can filter data points for sparse densities of darker colorants and replace the dark colorants with higher densities of lighter colorants. Table 1 above provides a good example using boundary surfaces.

In Table 1, all of the gray colors along the neutral axis from black to white are entirely rendered using g, Gr, and z. z is bounded to the region near the origin, as shown in FIG. 12. Gr is bounded to a somewhat larger region extending from the origin, as shown in FIG. 13. g can be used anywhere in the color space.

Or, alternatively, as shown in FIG. 16, a slightly different definition can be used for a g colorant boundary to constrain g to lighter regions of the color space, potentially reducing consumption of g ink. A tetrahedral boundary scheme, such as the one shown in FIGS. 13 and 14, is particularly well suited for 100% GCR with multiple levels of gray because each tetrahedron comprises the gray axis, one primary colorant corner, and one secondary colorant corner.

FIGS. 19-25 demonstrate operational flows for various embodiments of the present invention.

Figure 19:
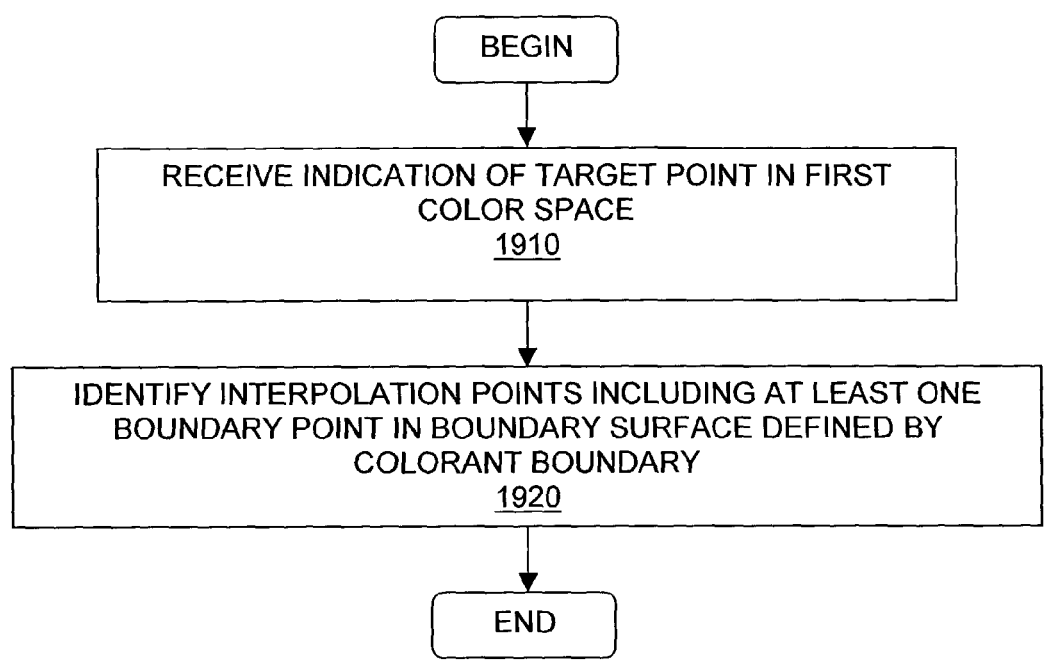
FIG. 19 illustrates one embodiment of identifying interpolation points.

In FIG. 19, an indication of a target point is received in a first color space at 1910. For instance, the indication may be a set of three step values in an RGB color space, such as those shown in Table 1. Alternately, the indication may be an index to a look-up table or an address to a memory location. At 1920, a set of interpolation points are identified for the target point in the first color space from which to interpolate a value for the target point in a second color space. The set of interpolation points includes at least one boundary point in a boundary surface defined by a colorant boundary. For example, this could involve branching out from the target point in two or three dimensions to control lines and boundary surfaces, whichever is encountered first.

Figure 20:
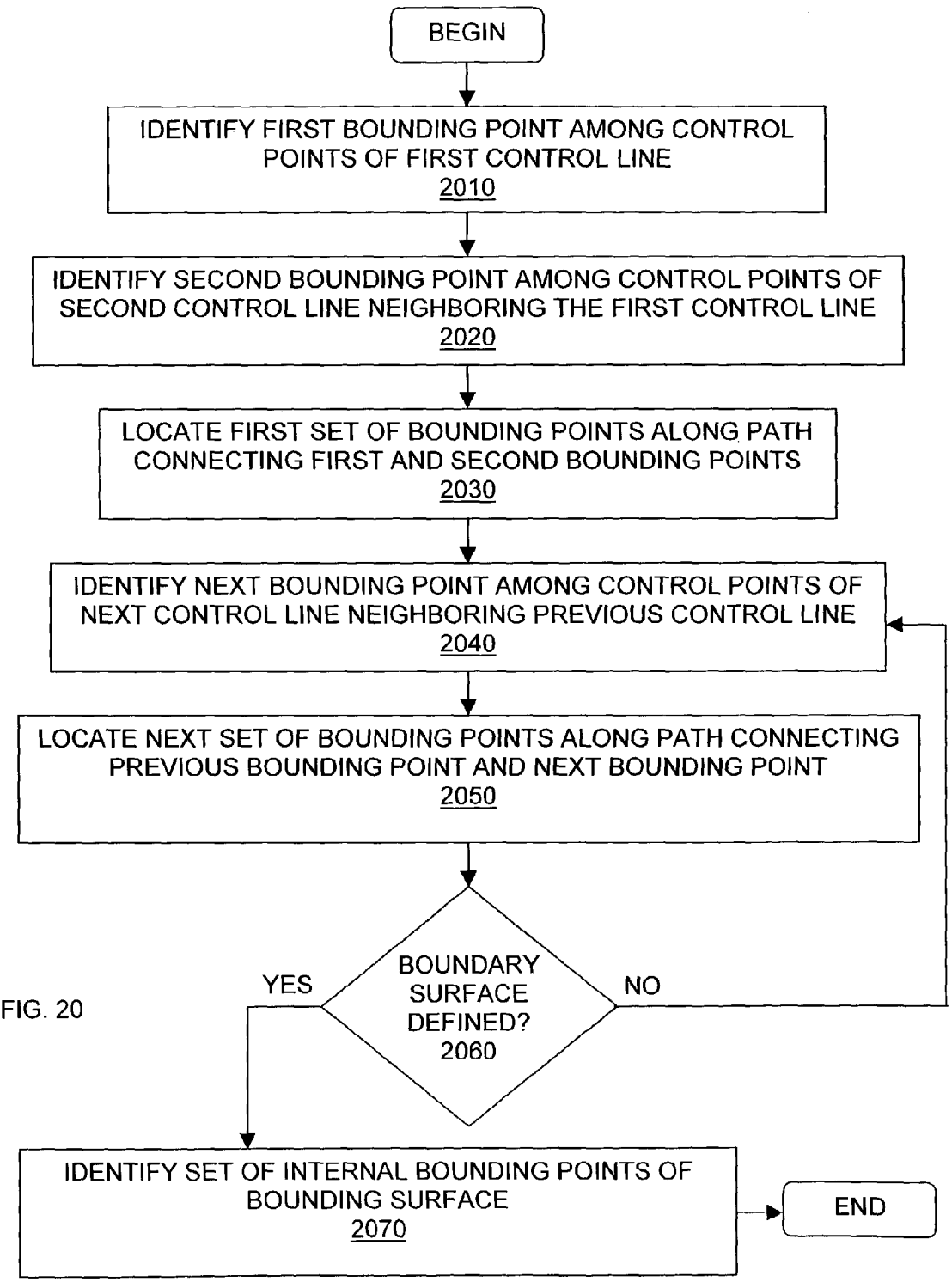
FIG. 20 illustrates one embodiment of defining a boundary surface.

FIG. 20 illustrates one embodiment for defining a boundary surface. At 2010, a first bounding point is identified among control points of a first control line. At 2020, a second bounding point is identified in a neighboring control line. Additional bounding points are identified along a path connecting the first and second bounding points at 2030. The path may be a straight line or it may be more complex including, for example, a number of steps roughly following a diagonal connection between two neighboring bounding points.

At 2040, the process moves on to the next neighboring control line and control point, and more bounding points are identified along the path to the next neighboring control point at 2050. The process repeats itself, adding additional sets of bounding points along edges of the bounding surface, until the edges of the bounding surface are all defined at 2060. Then, internal bounding points can be identified at 2070 as, for example, a set of points within a planar region bounded by the edges of the bounding surface.

Figure 21:
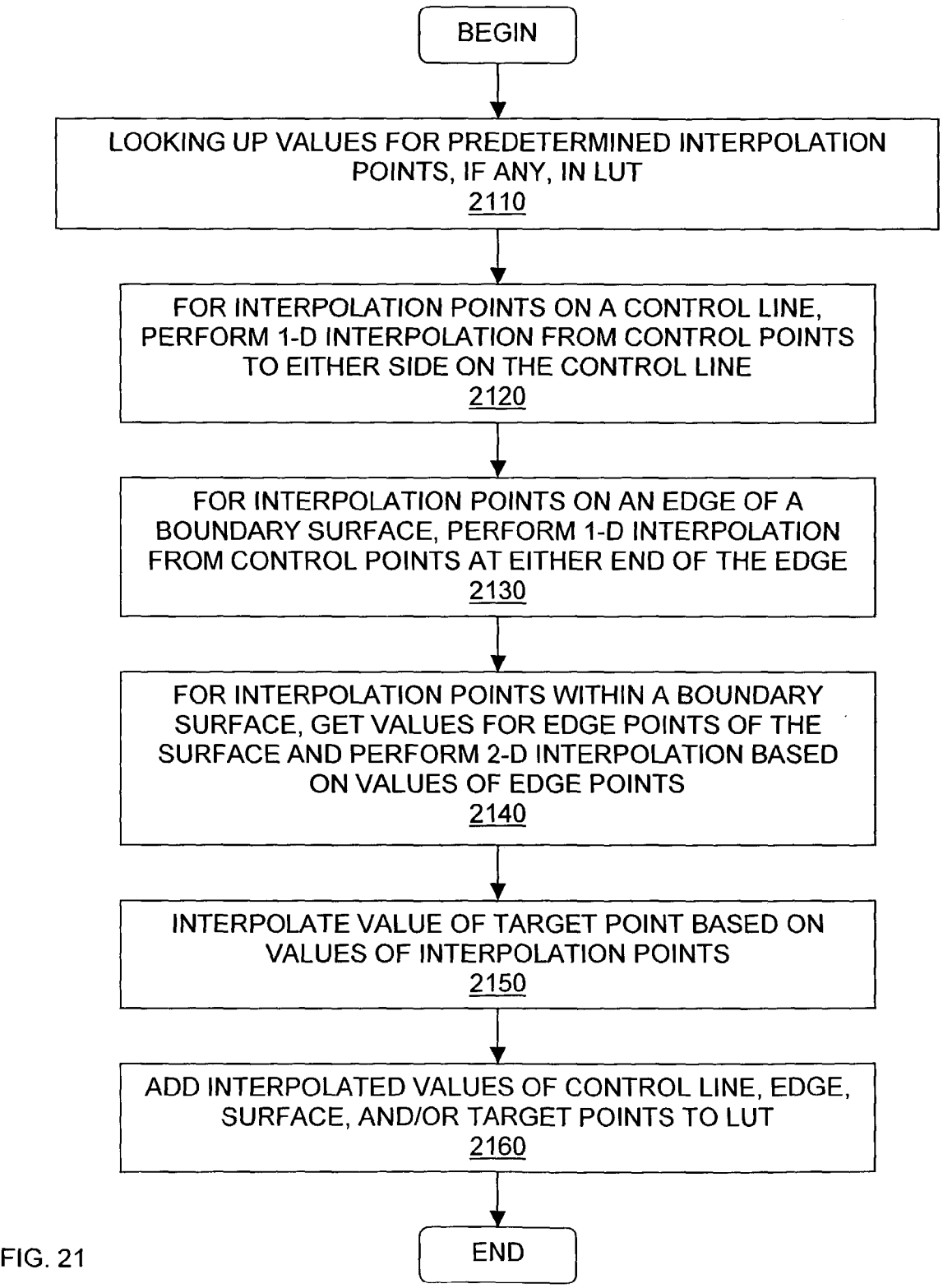
FIG. 21 illustrates one embodiment of interpolation.

FIG. 21 illustrates one embodiment of a multi-step interpolation process once a set of interpolation points have been identified for a particular target point. At 2110, the process starts by checking a look-up table (LUT) for any previously defined data points. These points could include control points, boundary points along boundary edges, boundary points within boundary surfaces, points on surfaces defined by control lines, and the like that may have been previously added to the table.

At 2120, for an interpolation point that is on a control line, but is not a control point, the process performs a one-dimensional interpolation based on the predetermined control points on the control line to either side of the interpolation point.

At 2130, for an interpolation point that is on an edge of a boundary surface, but is not available in the LUT, the process performs a one-dimensional interpolation based on the control points (boundary points) at either end of the edge.

At 2140, for an interpolation point within a boundary surface, the process acquires values for a set of edge points of the boundary surface that correspond to the interpolation point and performs a two-dimensional interpolation based on the values of the edges points. In other words, interpolating the value of a point within a boundary surface can involve two iterations of interpolation. First, some edge points may need to be linearly interpolated. Then, the values of the edges points can be used in a two-dimensional interpolation to get the value of the point within the surface. The same process can be used for interpolation points on surfaces defined by control lines.

At 2150, the target point is interpolated based on the values of the set of interpolation points. This could be a three-dimensional interpolation using, for instance, distance weighted, average values of the interpolation points. Other interpolation techniques can be used. At 2160, the illustrated embodiment adds the interpolated values of control line, edge, surface, and/or target points to the LUT for future reference.

Figure 22:
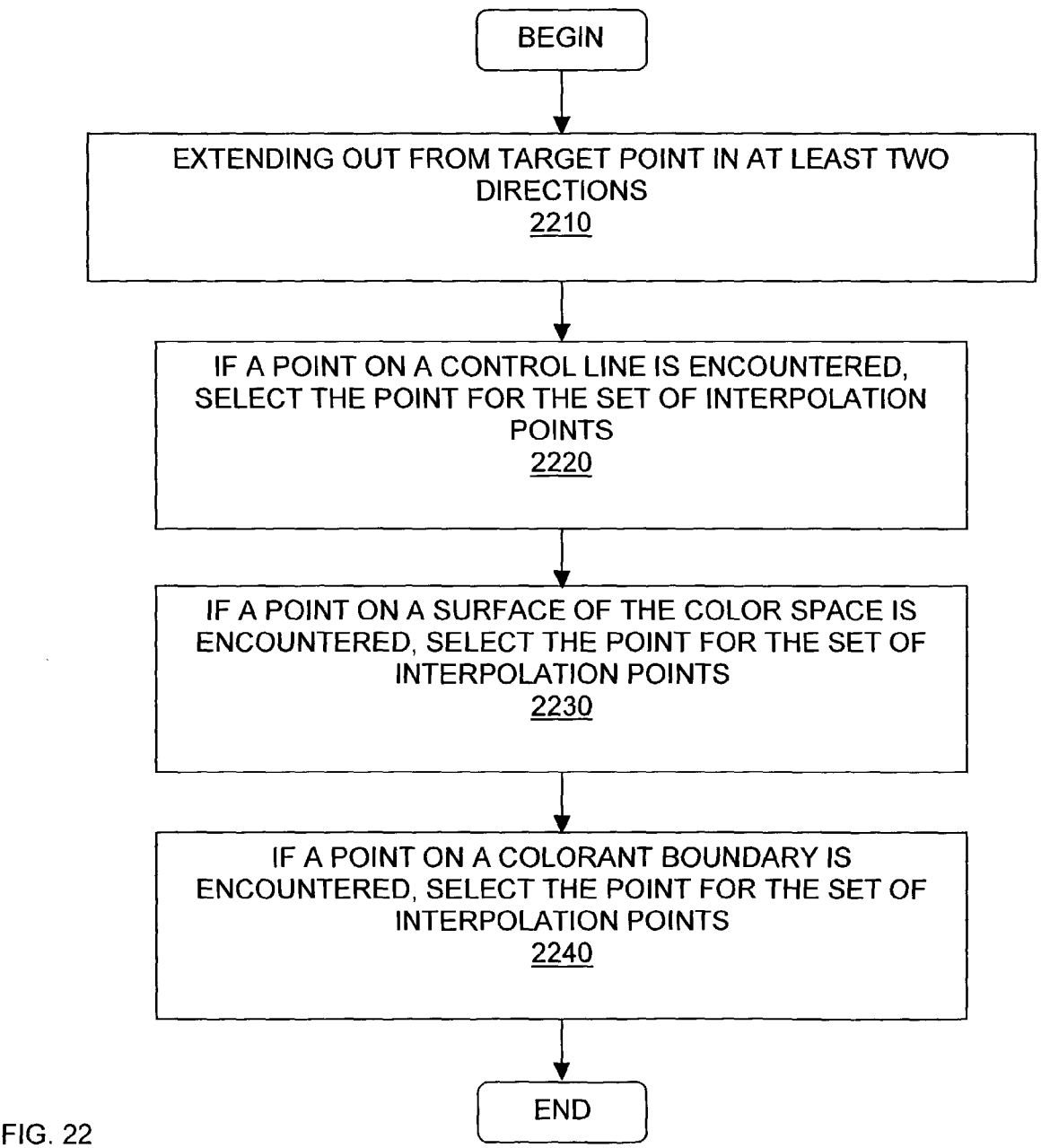
FIG. 22 illustrates one embodiment of selecting interpolation points.

FIG. 22 illustrates one embodiment of selecting a set of interpolation points. At 2210, the process extends out from a target point in at least two directions. For a target point on a control line or boundary edge, the two directions may be to either side of the target point along the control line or boundary edge. For a target point on a surface defined by a set of control lines or on a boundary surface, the process may extend out in four directions, such as in the positive and negative directions of primary colorant axes parallel to the surface. For a target point not on a line, edge, or surface, the process may extend out in six directions, such as the positive and negative direction of all three primary axes.

At 2220, if a point on a control line is encountered in a given extension, that point can be selected for the set of interpolation points and the extension can be stopped. At 2230, if a point on a surface of the color space is encountered in a given extension, that point can be selected for the set of interpolation points and the extension can be stopped. Similarly, at 2240, if a point is encountered in a given extension on either a surface or edge of a colorant boundary, that point can be selected for the set of interpolation points and the extension can be stopped.

Figure 23A:
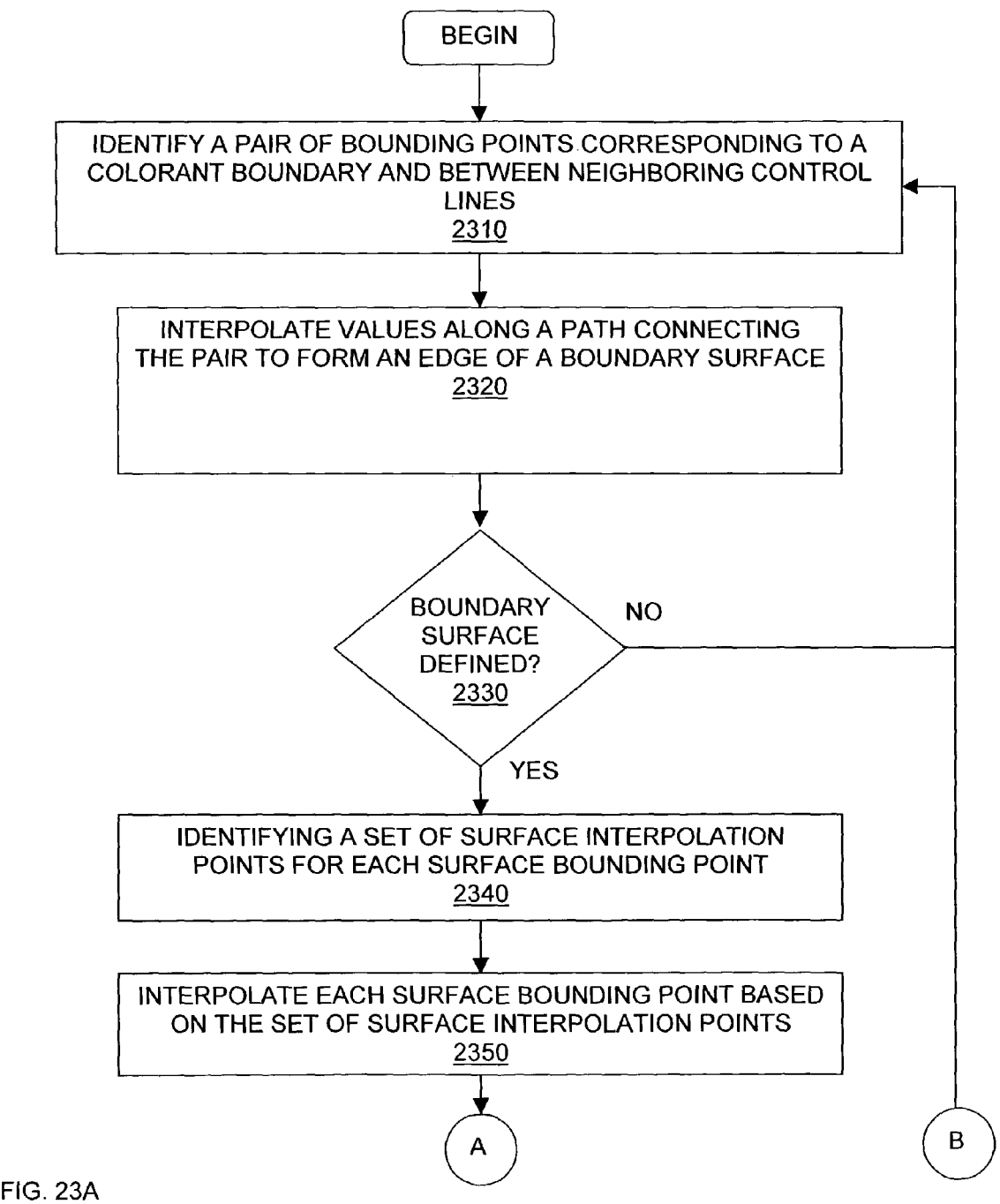
FIGS. 23A and B illustrate one embodiment of interpolating points.
Figure 23B:
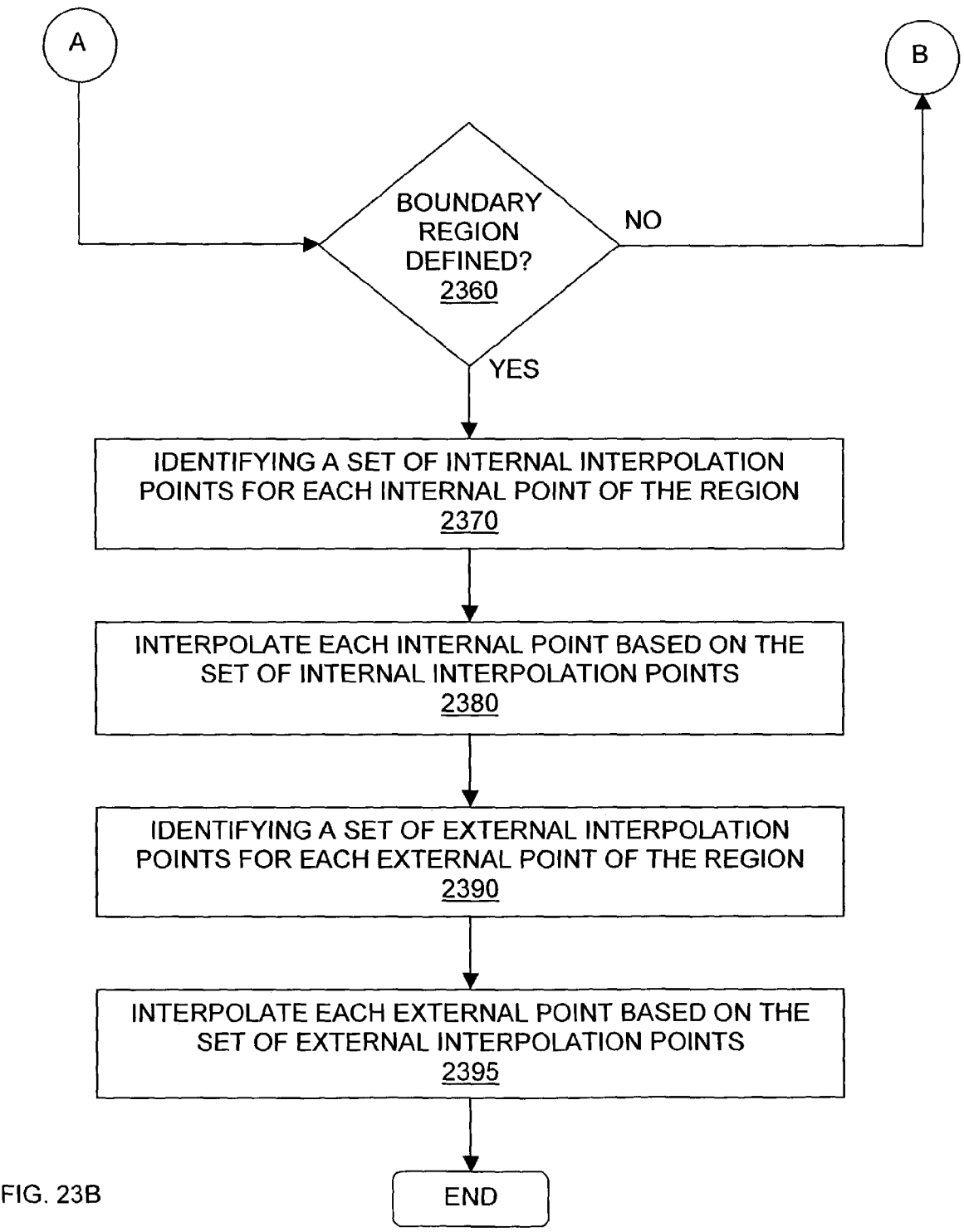

FIG. 23 illustrates one embodiment of both identifying and interpolating a set of boundary points for a color space having one colorant boundary that defines a multi-surface boundary region. At 2310, the process identifies a pair of bounding points corresponding to a particular colorant boundary and located along neighbor control lines in a first color space. At 2320, the process linearly interpolates values of points at intervals along a path connecting the pair of boundary points. The interpolated points along the path comprise an edge of a boundary surface. Additional boundary points are identified and additional values are interpolated along edges of the boundary surface until all the edges of the surface have been defined at 2330.

Next, bounding points within the surface are interpolated. These surface bounding points may include points spread over the surface at particular intervals. For each surface bounding point, a set of surface interpolation points is identified at 2340. The surface interpolation points may be boundary points located along the edges of the boundary surface in particular directions from the corresponding surface bounding point. At 2350, each surface bounding point is interpolated based on the corresponding set of surface interpolation points.

At 2360, the process loops back to 2310 through 2350 to identify and interpolate additional boundary surfaces until all of the boundary surfaces of a boundary region are identified. For instance, in the case of the z boundary from FIG. 12 above, the process may repeat for at least the three boundary surfaces of the z boundary region 1230 that are internal to the color cube. Alternately, the process may repeat for all six surfaces of region 1230.

Next, points within the boundary region are interpolated. These internal points may include points spread throughout the region at particular intervals. For each internal point, a set of internal interpolation points is identified at 2370. These may be located along the boundary surfaces in particular directions from the corresponding internal point. At 2380, each internal point is interpolated based on the corresponding set of internal interpolation points.

Next, points outside the boundary region are interpolated. These external points may include points spread throughout the color space at particular intervals, outside the boundary region. For each external point, a set of external interpolation points is identified at 2390. These may be located along the boundary surfaces, and/or surfaces defined by the set of control lines, in particular directions from the corresponding internal point. At 2395, each external point is interpolated based on the corresponding set of external interpolation points. This may involve an intermediate interpolation step to get values for some of the points located on surfaces defined by the set of control lines.

Figure 24:
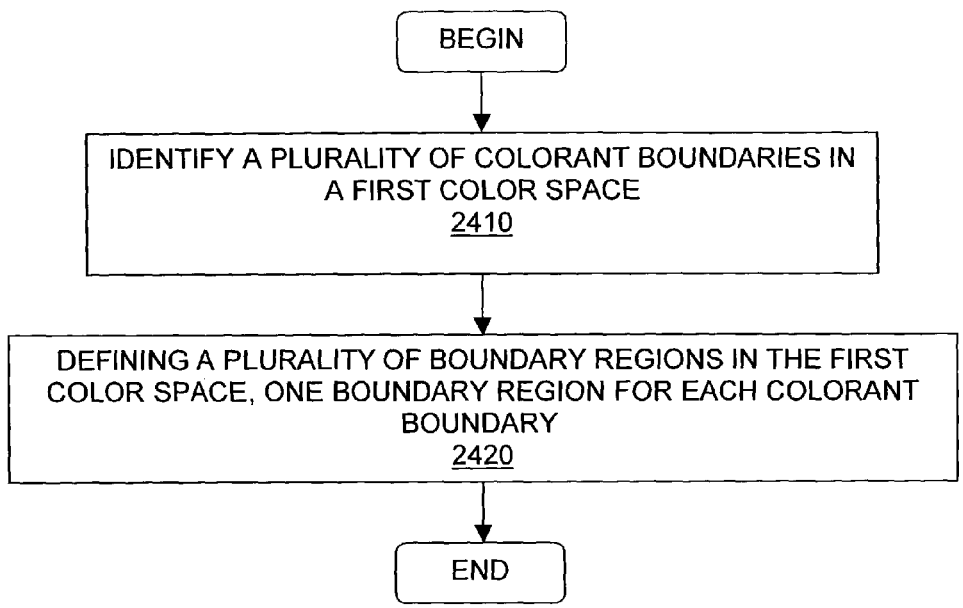
FIG. 24 illustrates one embodiment of multiple colorant boundaries.

FIG. 24 illustrates one embodiment in a color space having multiple colorant boundaries. At 2410, a plurality of colorant boundaries are identified in a first color space. These could include, for instance, the z, Gr, C, and M boundaries used in Table 1 above. At 2420, one boundary region is defined in the first color space for each colorant boundary.

Figure 25:
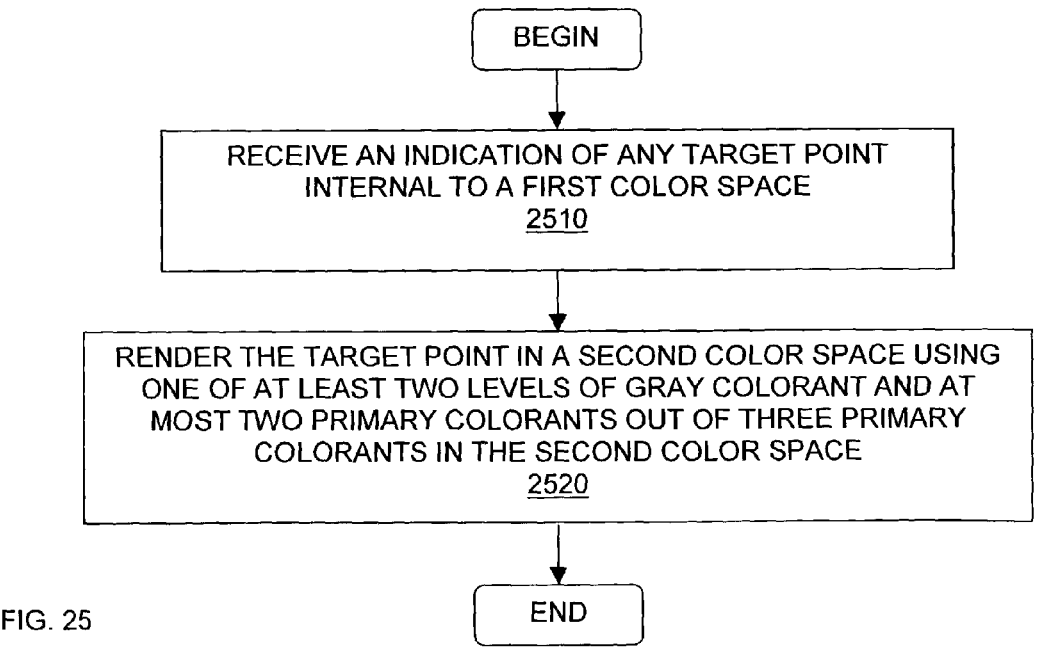
FIG. 25 illustrates one embodiment of 100% gray component replacement.

FIG. 25 illustrates one embodiment of 100% gray component replacement (GCR) using multiple levels of gray ink. At 2510, an indication of a target point is received. The target point is internal to a first color space. That is, the target point is not located on one of the external surfaces of the color space. Each external surface may be rendered using just two primary colorants, so gray component replacement might not be needed for the external surfaces.

At 2520, the target point is rendered in a second color space using at least one of at least two levels of gray colorant and at most two primary colorants out of three primary colorants in the second color space.

FIGS. 19-25 illustrate a number of implementation specific details. Other embodiments may not include all of the illustrated elements, may arrange the elements in a different order, may combine or separate one or more of the elements, and may include additional elements.

Figure 26:
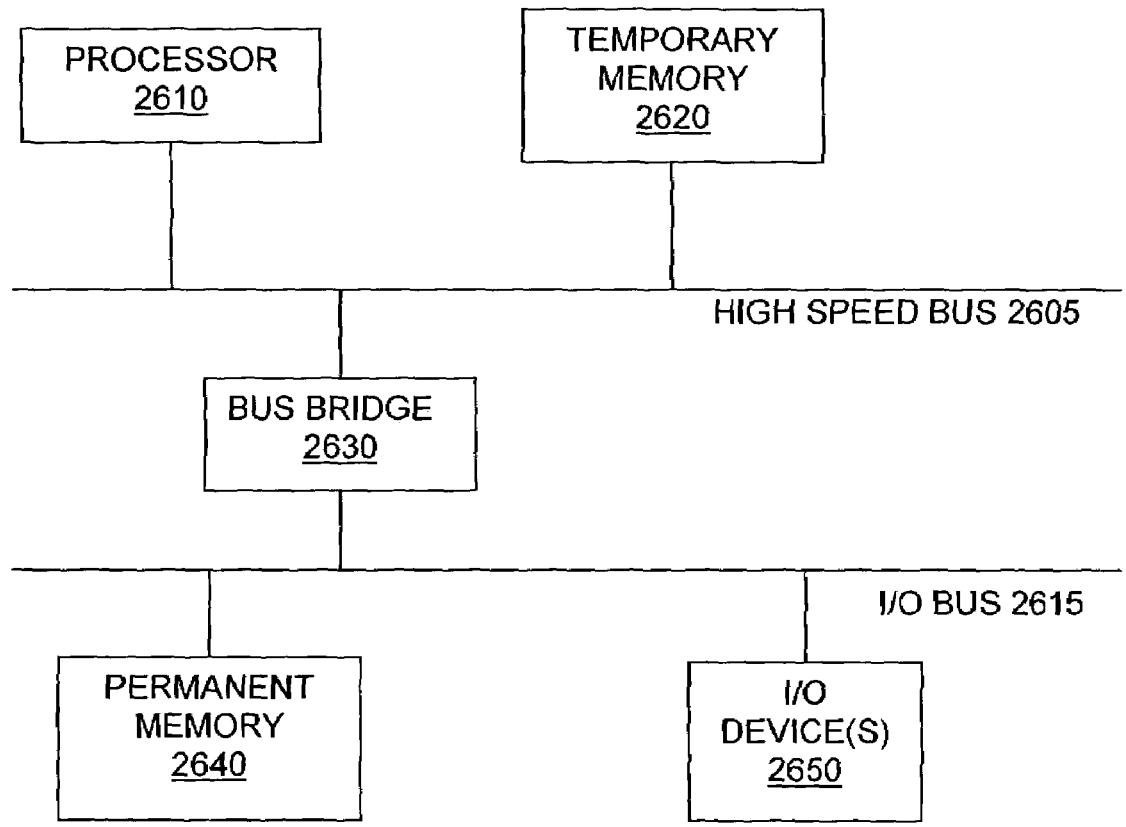
FIG. 26 illustrates one embodiment of a hardware system.

FIG. 26 illustrates one embodiment of a hardware system intended to represent a broad category of devices such as personal computers, workstations, embedded systems, and/or imaging devices such as color printers. In the illustrated embodiment, the hardware system includes processor 2610 coupled to high speed bus 2605, which is coupled to input/output (I/O) bus 2615 through bus bridge 2630. Temporary memory 2620 is coupled to bus 2605. Permanent memory 2640 is coupled to bus 2615. I/O device(s) 2650 is also coupled to bus 2615. I/O device(s) 2650 may include a display device, a keyboard, one or more external network interfaces, a printing mechanism, etc.

Certain embodiments may include additional components, may not require all of the above components, or may combine one or more components. For instance, temporary memory 2620 may be on-chip with processor 2610. Alternately, permanent memory 2640 may be eliminated and temporary memory 2620 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternate internal networks including, for instance, an internal network based on a high speed system bus with a memory controller hub and an I/O controller hub. Additional components may include additional processors, a CD ROM drive, additional memories, and other peripheral components known in the art.

In one embodiment, the present invention, as described above, is implemented using one or more hardware systems such as the hardware system of FIG. 26. Where more than one computer is used, the systems can be coupled to communicate over an external network, such as a local area network (LAN), an internet protocol (IP) network, etc. In one embodiment, the present invention is implemented as software routines executed by one or more execution units within the computer(s). For a given computer, the software routines can be stored on a storage device, such as permanent memory 2640.

Figure 27:
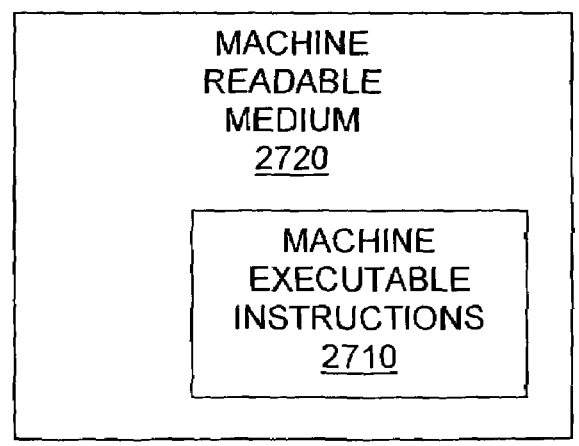
FIG. 27 illustrates one embodiment of a machine readable medium.

Alternately, as shown in FIG. 27, the software routines can be machine executable instructions 2710 stored using any machine readable storage medium 2720, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device(s) 2650 of FIG. 26.

From whatever source, the instructions may be copied from the storage device into temporary memory 2620 and then accessed and executed by processor 2610. In one implementation, these software routines are written in the C programming language. It is to be appreciated, however, that these routines may be implemented in any of a wide variety of programming languages.

In alternate embodiments, the present invention is implemented in discrete hardware or firmware, such as identification circuitry or defining circuitry to identify or define boundary surfaces, interpolation circuitry for interpolating based on the boundary surfaces, and rendering circuitry for gray component rendering. For example, one or more application specific integrated circuits (ASICs) could be programmed with one or more of the above described functions of the embodiments of the present invention. In another example, one or more functions of the embodiments of the present invention could be implemented in one or more ASICs on additional circuit boards and the circuit boards could be inserted into the computer(s) described above. In another example, programmable gate arrays could be used to implement one or more functions of embodiments of the present invention. In yet another example, a combination of hardware and software could be used to implement one or more functions of the embodiments of the present invention.

Thus, gray component replacement using multiple levels of gray is described. Whereas many alterations and modifications of the embodiments of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:
   receiving an indication of any target point internal to a first color space; and
   rendering the target point in a second color space using one of at least two levels of gray colorant and at most two primary colorants out of three primary colorants in the second color space for any target point internal to the first color space.

2. The method of claim 1 further comprising:
   receiving an indication of any surface target point on a surface of the first color space; and
   rendering the surface target point in the second color space using at most two primary colorants out of the three primary colorants in the second color space.

3. The method of claim 1 wherein the first color space comprises a red, blue, green (RGB) color space.

4. The method of claim 1 wherein the second color space comprises a cyan, magenta, yellow color space in which the three primary colorants are cyan, magenta, and yellow colorants.

5. The method of claim 1 wherein at least one of:
   the cyan colorant includes a light cyan sub-colorant and a dark cyan sub-colorant; and
   the magenta colorant includes a light magenta sub-colorant and a dark magenta sub-colorant.

6. The method of claim 1 wherein the at least two levels of gray colorant comprises a light gray sub-colorant, a medium gray sub-colorant, and a black sub-colorant.

7. A method comprising:
   receiving an indication of any target point internal to a first color space; and
   rendering the target point in a second color space using one of at least two levels of gray colorant and at most two primary colorants out of three primary colorants in the second color space, wherein rendering the target point in the second color space comprises:
   identifying a set of interpolation points in the first color space from which to interpolate a value of the target point in the second color space, said set of interpolation points comprising a boundary point corresponding to one of the at least two levels of gray colorant; and
   interpolating the value of the target point in the second color space based on values of the set of interpolation points in the second color space.

8. The method of claim 7 wherein:
prior to identifying the set of interpolation points, the method further comprises defining a plurality of boundary regions in the first color space; and
identifying the set of interpolation points comprises locating the set of interpolation points among surfaces of the plurality of boundary regions.

9. The method of claim 8 wherein defining the plurality of boundary regions comprises:
   defining a first plurality of colorant boundaries in the first color space, said first plurality of colorant boundaries dividing the first color space into six tetrahedra, each of the six tetrahedra comprising a neutral axis, a primary colorant corner, and a secondary colorant corner.

10. The method of claim 9 wherein defining the plurality of boundary regions further comprises:
   defining a second plurality of colorant boundaries in the first color space, said second plurality of colorant boundaries defining gray boundary planes dividing each of the six tetrahedra based on a boundary point along the neutral axis for each of the at least two levels of gray colorant.

11. The method of claim 9 wherein defining the plurality of boundary regions further comprises:
   defining a second plurality of colorant boundaries in the first color space, said second plurality of colorant boundaries defining gray boundary regions dividing each of the six tetrahedra based on boundary points along the neutral axis for each of the at least two levels of gray colorant and a boundary point along a black to yellow transition for a light gray colorant.

12. The method of claim 9 wherein defining the plurality of boundary regions further comprises:
   defining a second plurality of colorant boundaries in the first color space, said second plurality of colorant boundaries defining dark dye boundary regions among the six tetrahedra.

13. The method of claim 7 wherein interpolating the value of the target point comprises at least one of:
   looking up the values for at least some of the set of interpolation points in a look-up table; and
   performing one or more iterations of interpolation to determine the values for at least some of the set of interpolation points starting from points in the first color space having predetermined values.

14. A computer readable storage medium having stored thereon a computer program, the execution of which by a computer implement a method comprising:
   receiving an indication of any target point internal to a first color space; and
   rendering the target point in a second color space using one of at least two levels of gray colorant and at most two primary colorants out of three primary colorants in the second color space for any target point internal to the first color space.

15. A computer readable storage medium having stored thereon a computer program, the execution of which by a computer implement a method comprising:
   receiving an indication of any target point internal to a first color space; and
   rendering the target point in a second color space using one of at least two levels of gray colorant and at most two primary colorants out of three primary colorants in the second color space, wherein the rendering the target point in the second color space comprises:
      identifying a set of interpolation points in the first color space from which to interpolate a value of the target point in the second color space, said set of interpolation points comprising a boundary point corresponding to one of the at least two levels of gray colorant; and
      interpolating the value of the target point in the second color space based on values of the set of interpolation points in the second color space.

16. The computer readable storage medium of claim 15 wherein:
   prior to identifying the set of interpolation points, the method further comprises defining a plurality of boundary regions in the first color space; and
   identifying the set of interpolation points comprises locating the set of interpolation points among surfaces of the plurality of boundary regions.

17. The computer readable storage medium of claim 16 wherein defining the plurality of boundary regions comprises:
   defining a first plurality of colorant boundaries in the first color space, said first plurality of colorant boundaries dividing the first color space into six tetrahedra, each of the six tetrahedra comprising a neutral axis, a primary colorant corner, and a secondary colorant corner.

18. The computer readable storage medium of claim 17 wherein defining the plurality of boundary regions further comprises:
   defining a second plurality of colorant boundaries in the first color space, said second plurality of colorant boundaries defining gray boundary planes dividing each of the six tetrahedra based on a boundary point along the neutral axis for each of the at least two levels of gray colorant.

19. The computer readable storage medium of claim 17 wherein defining the plurality of boundary regions further comprises:
   defining a second plurality of colorant boundaries in the first color space, said second plurality of colorant boundaries defining gray boundary regions dividing each of the six tetrahedra based on boundary points along the neutral axis for each of the at least two levels of gray colorant and a boundary point along a black to yellow transition for a light gray colorant.

20. The computer readable storage medium of claim 17 wherein defining the plurality of boundary regions further comprises:
   defining a second plurality of colorant boundaries in the first color space, said second plurality of colorant boundaries defining dark dye boundary regions among the six tetrahedra.

21. The computer readable storage medium of claim 15 wherein interpolating the value of the target point comprises at least one of:
   looking up the values for at least some of the set of interpolation points in a look-up table; and performing one or more iterations of interpolation to determine the values for at least some of the set of interpolation points starting from points in the first color space having predetermined values.

22. An apparatus comprising:
receiving circuitry to receive an indication of any target point internal to a first color space; and
rendering circuitry to render the target point in a second color space using one of at least two levels of gray colorant and at most two primary colorants out of three primary colorants in the second color space for any target point internal to the first color space.

23. The apparatus of claim 22 wherein the apparatus comprises at least one of:
a processor; and
an application specific integrated circuit (ASIC).

24. An apparatus comprising:
receiving circuitry to receive an indication of any target point internal to a first color space; and
rendering circuitry to render the target point in a second color space using one of at least two levels of gray colorant and at most two primary colorants out of three primary colorants in the second color space,
wherein the rendering circuitry comprises:
identifying circuitry to identify a set of interpolation points in the first color space from which to interpolate a value of the target point in the second color space, said set of interpolation points comprising a boundary point corresponding to one of the at least two levels of gray colorant; and
interpolating circuitry to interpolate the value of the target point in the second color space based on values of the set of interpolation points in the second color space.

25. The apparatus of claim 24 further comprising:
defining circuitry to define a plurality of boundary regions in the first color space prior to identification of the set of interpolation points; and
wherein the identifying circuitry locates the set of interpolation points among surfaces of the plurality of boundary regions.

26. The apparatus of claim 25 wherein the defining circuitry is further to:
define a first plurality of colorant boundaries in the first color space, said first plurality of colorant boundaries dividing the first color space into six tetrahedra, each of the six tetrahedra comprising a neutral axis, a primary colorant corner, and a secondary colorant corner.

27. The apparatus of claim 26 wherein the defining circuitry is further to:
define a second plurality of colorant boundaries in the first color space, said second plurality of colorant boundaries defining gray boundary planes dividing each of the six tetrahedra based on a boundary point along the neutral axis for each of the at least two levels of gray colorant.

28. The apparatus of claim 26 wherein the defining circuitry is further to:
define a second plurality of colorant boundaries in the first color space, said second plurality of colorant boundaries defining gray boundary regions dividing each of the six tetrahedra based on boundary points along the neutral axis for each of the at least two levels of gray colorant and a boundary point along a black to yellow transition for a light gray colorant.

29. The apparatus of claim 26 wherein the defining circuitry is further to:
define a second plurality of colorant boundaries in the first color space, said second plurality of colorant boundaries defining dark dye boundary regions among the six tetrahedra.

30. The apparatus of claim 24 wherein the interpolating circuitry comprises at least one of:
a look-up table to look up the values for at least some of the set of interpolation points; and
wherein the interpolation circuitry is to perform one or more iterations of interpolation to determine the values for at least some of the set of interpolation points starting from points in the first color space having predetermined values.

31. An apparatus comprising:
means for receiving an indication of any target point internal to a first color space; and
means for rendering the target point in a second color space using one of at least two levels of gray colorant and at most two primary colorants out of three primary colorants in the second color space for any target point internal to the first color space.

32. An apparatus comprising:
means for receiving an indication of any target point internal to a first color space; and
means for rendering the target point in a second color space using one of at least two levels of gray colorant and at most two primary colorants out of three primary colorants in the second color space,
wherein the means for rendering the target point in the second color space comprises:
means for identifying a set of interpolation points in the first color space from which to interpolate a value of the target point in the second color space, said set of interpolation points comprising a boundary point corresponding to one of the at least two levels of gray colorant; and
means for interpolating the value of the target point in the second color space based on values of the set of interpolation points in the second color space.

33. The apparatus of claim 32 further comprising:
means for defining a plurality of boundary regions in the first color space; and
wherein the means for identifying the set of interpolation points comprises means for locating the set of interpolation points among surfaces of the plurality of boundary regions.

34. The apparatus of claim 33 wherein the means for defining the plurality of boundary regions comprises:
means for defining a first plurality of colorant boundaries in the first color space, said first plurality of colorant boundaries dividing the first color space into six tetrahedra, each of the six tetrahedra comprising a neutral axis, a primary colorant corner, and a secondary colorant corner.

35. The apparatus of claim 34 wherein the means for defining the plurality of boundary regions further comprises:
means for defining a second plurality of colorant boundaries in the first color space, said second plurality of colorant boundaries defining gray boundary planes dividing each of the six tetrahedra based on a boundary point along the neutral axis for each of the at least two levels of gray colorant.

36. The apparatus of claim 34 wherein the means for defining the plurality of boundary regions further comprises:

means for defining a second plurality of colorant boundaries in the first color space, said second plurality of colorant boundaries defining gray boundary regions dividing each of the six tetrahedra based on boundary points along the neutral axis for each of the at least two levels of gray colorant and a boundary point along a black to yellow transition for a light gray colorant.

37. The apparatus of claim 34 wherein the means for defining the plurality of boundary regions further comprises:
means for defining a second plurality of colorant boundaries in the first color space, said second plurality of colorant boundaries defining dark dye boundary regions among the six tetrahedra.

38. The apparatus of claim 32 wherein the means for interpolating the value of the target point comprises at least one of:
means for looking up the values for at least some of the set of interpolation points in a look-up table; and
means for performing one or more iterations of interpolation to determine the values for at least some of the set of interpolation points starting from points in the first color space having predetermined values.

39. An imaging system comprising:
a printing mechanism to print an image in a first color space;
receiving circuitry to receive an indication of any target point internal to the first color space; and
rendering circuitry to render the target point in a second color space using one of at least two levels of gray colorant and at most two primary colorants out of three primary colorants in the second color space for any target point internal to the first color space.

40. An imaging system comprising:
a printing mechanism to print an image in a first color space;
receiving circuitry to receive an indication of any target point internal to the first color space; and
rendering circuitry to render the target point in a second color space using one of at least two levels of gray colorant and at most two primary colorants out of three primary colorants in the second color space,
wherein the rendering circuitry comprises:
identifying circuitry to identify a set of interpolation points in the first color space from which to interpolate a value of the target point in the second color space, said set of interpolation points comprising a boundary point corresponding to one of the at least two levels of gray colorant; and
interpolating circuitry to interpolate the value of the target point in the second color space based on values of the set of interpolation points in the second color space.

41. The system of claim 40 further comprising:
defining circuitry to define a plurality of boundary regions in the first color space prior to identification of the set of interpolation points; and
wherein the identifying circuitry locates the set of interpolation points among surfaces of the plurality of boundary regions.

42. The system of claim 41 wherein the defining circuitry is further to:
define a first plurality of colorant boundaries in the first color space, said first plurality of colorant boundaries dividing the first color space into six tetrahedra, each of the six tetrahedra comprising a neutral axis, a primary colorant corner, and a secondary colorant corner.

43. The system of claim 42 wherein the defining circuitry is further to:
define a second plurality of colorant boundaries in the first color space, said second plurality of colorant boundaries defining gray boundary planes dividing each of the six tetrahedra based on a boundary point along the neutral axis for each of the at least two levels of gray colorant.

44. The system of claim 42 wherein the defining circuitry is further to:
define a second plurality of colorant boundaries in the first color space, said second plurality of colorant boundaries defining gray boundary regions dividing each of the six tetrahedra based on boundary points along the neutral axis for each of the at least two levels of gray colorant and a boundary point along a black to yellow transition for a light gray colorant.

45. The system of claim 42 wherein the defining circuitry is further to:
define a second plurality of colorant boundaries in the first color space, said second plurality of colorant boundaries defining dark dye boundary regions among the six tetrahedra.

46. The system of claim 40 wherein the interpolating circuitry comprises at least one of:
a look-up table to look up the values for at least some of the set of interpolation points; and
wherein the interpolation circuitry is to perform one or more iterations of interpolation to determine the values for at least some of the set of interpolation points starting from points in the first color space having predetermined values.

* * * * *